(12) United States Patent
Schneider

(10) Patent No.: US 7,934,494 B1
(45) Date of Patent: May 3, 2011

(54) COLLAPSIBLE HEATING APPARATUS

(76) Inventor: Donna Gail Schneider, Manitou Springs, CO (US)

( * ) Notice: Subject to any disclaimer, the term of this patent is extended or adjusted under 35 U.S.C. 154(b) by 621 days.

(21) Appl. No.: 10/684,312

(22) Filed: Oct. 10, 2003

(51) Int. Cl.
*F26B 11/02* (2006.01)

(52) U.S. Cl. ......... 126/241; 126/9 B; 126/9 R; 126/38; 126/274; 126/29; 126/30; 705/1; 705/14; 190/12 R; 52/715; 312/236; 347/19; 347/102; 219/521; 219/404

(58) Field of Classification Search .................. 126/9 R, 126/9 B, 25 A, 40, 50, 519, 544, 241, 38, 126/274, 30, 29; 190/12 R; 52/715; 312/236; 219/521, 404; 99/423, 467; 347/19, 102; 705/1, 14
See application file for complete search history.

(56) References Cited

U.S. PATENT DOCUMENTS

| | | | | |
|---|---|---|---|---|
| 561,856 A * | 6/1896 | Baxter | | 126/9 R |
| 1,006,361 A * | 10/1911 | Daly | | 248/241 |
| 1,198,693 A * | 9/1916 | Bond | | 126/9 B |
| 1,209,610 A * | 12/1916 | Muehleisen | | 126/38 |
| 1,216,008 A * | 2/1917 | Stonebridge | | 126/274 |
| 1,250,861 A * | 12/1917 | Hackney | | 126/9 R |
| 1,268,509 A * | 6/1918 | Stone | | 312/263 |
| 1,403,842 A * | 1/1922 | Chambers et al. | | 126/30 |
| 1,411,596 A | 4/1922 | Tallman | | |
| 1,442,763 A * | 1/1923 | Dyer | | 126/29 |
| 1,448,148 A * | 3/1923 | O'Kane | | 126/29 |
| 1,448,900 A * | 3/1923 | McElroy | | 126/38 |
| 1,478,371 A * | 12/1923 | Albrighton | | 190/12 R |
| 1,491,080 A * | 4/1924 | Clark | | 126/29 |
| 1,575,931 A * | 3/1926 | Orlopp | | 52/715 |
| 1,582,346 A * | 4/1926 | Oster | | 312/236 |
| 1,600,776 A * | 9/1926 | Peron | | 99/345 |
| 1,626,035 A * | 4/1927 | Hanson | | 126/38 |
| 1,987,378 A * | 1/1935 | Tansley | | 220/6 |
| 2,003,974 A * | 6/1935 | Pearson | | 126/25 R |
| 2,020,503 A * | 11/1935 | Hanson et al. | | 248/188.5 |
| 2,053,577 A * | 9/1936 | Pearson | | 126/25 R |
| 2,055,972 A * | 9/1936 | Fritsche | | 219/452.13 |
| 2,119,799 A * | 6/1938 | Sivey | | 126/9 R |
| 2,148,439 A * | 2/1939 | Crawford | | 206/216 |
| 2,201,756 A * | 5/1940 | Avetta | | 126/25 R |
| 2,237,081 A * | 4/1941 | Owens | | 126/25 R |
| 2,255,466 A * | 9/1941 | Jenkins | | 219/521 |
| 2,285,597 A * | 6/1942 | Allen et al. | | 108/120 |
| 2,323,620 A * | 7/1943 | Parke et al. | | 105/315 |
| 2,386,815 A * | 10/1945 | Roberts | | 126/25 A |
| 2,403,134 A * | 7/1946 | Stephenson | | 126/25 B |
| 2,408,859 A * | 10/1946 | Leake, Jr. | | 126/9 R |
| 2,441,190 A * | 5/1948 | Fuller | | 126/25 R |
| 2,473,047 A * | 6/1949 | Bershad | | 211/189 |
| 2,473,569 A * | 6/1949 | Cast | | 126/9 R |

(Continued)

FOREIGN PATENT DOCUMENTS

EP 1213400 A2 * 6/2002

(Continued)

OTHER PUBLICATIONS

Fox Hill Corp., "Single Oven", Website, Oct. 9, 2003.

(Continued)

*Primary Examiner* — Stephen M. Gravini

(57) ABSTRACT

A collapsible unit for supporting food items over a heat source comprises a collapsible frame enclosure wherein at least one side of the frame is reconfigurable to enable various types of cooking and heating arrangements.

7 Claims, 15 Drawing Sheets

U.S. PATENT DOCUMENTS

| | | | | |
|---|---|---|---|---|
| 2,477,529 A * | 7/1949 | Sprinkle et al. | | 126/9 R |
| 2,488,014 A * | 11/1949 | Higman | | 126/59 |
| 2,507,243 A * | 5/1950 | Boyd et al. | | 99/421 R |
| 2,511,515 A * | 6/1950 | Schmitt | | 126/9 R |
| 2,515,521 A * | 7/1950 | Loffredo | | 126/9 B |
| 2,540,875 A * | 2/1951 | Genge | | 108/120 |
| 2,552,861 A * | 5/1951 | Overman | | 126/25 R |
| 2,573,772 A * | 11/1951 | Nysten | | 99/467 |
| 2,582,720 A * | 1/1952 | Roberts | | 126/25 A |
| 2,618,525 A * | 11/1952 | Panzer | | 108/172 |
| 2,625,148 A * | 1/1953 | Snyder | | 126/25 B |
| 2,627,854 A * | 2/1953 | Sava | | 126/25 R |
| 2,631,216 A * | 3/1953 | Ames | | 392/418 |
| 2,631,579 A * | 3/1953 | Metzger | | 126/29 |
| 2,669,815 A * | 2/1954 | Zinn, Jr. et al. | | 53/479 |
| 2,692,807 A * | 10/1954 | Cordola | | 108/120 |
| 2,734,499 A * | 2/1956 | Lombardi | | 126/25 R |
| 2,774,345 A * | 12/1956 | Peplin | | 126/25 R |
| 2,778,700 A * | 1/1957 | Mayer | | 108/115 |
| 2,790,434 A * | 4/1957 | Del Francia | | 126/41 R |
| 2,822,653 A * | 2/1958 | Zinn, Jr. et al. | | 53/373.8 |
| 2,828,733 A * | 4/1958 | Moore, Jr. | | 126/25 R |
| 2,839,043 A * | 6/1958 | La Born | | 126/30 |
| 2,844,702 A * | 7/1958 | Staats | | 219/405 |
| 2,848,592 A * | 8/1958 | Mergen | | 219/404 |
| 2,852,663 A * | 9/1958 | Stuffer et al. | | 362/354 |
| 2,857,228 A * | 10/1958 | Koett | | 108/115 |
| 2,866,883 A * | 12/1958 | Borden | | 126/25 B |
| 2,867,165 A * | 1/1959 | Money | | 99/423 |
| 2,868,111 A * | 1/1959 | Laskowski | | 99/392 |
| 2,871,075 A * | 1/1959 | Stone | | 108/119 |
| 2,885,950 A * | 5/1959 | Stoll et al. | | 99/340 |
| 2,900,897 A * | 8/1959 | Fisher | | 99/340 |
| 2,909,152 A * | 10/1959 | Cordis | | 119/309 |
| 2,909,171 A * | 10/1959 | Lof | | 126/681 |
| 2,923,229 A * | 2/1960 | Halford | | 99/339 |
| 2,946,275 A * | 7/1960 | Compton | | 99/390 |
| 2,961,942 A * | 11/1960 | Terry | | 99/340 |
| 2,995,257 A * | 8/1961 | Blaise | | 211/208 |
| 3,005,451 A * | 10/1961 | Richart | | 126/25 R |
| 3,031,243 A * | 4/1962 | Crevoi | | 108/120 |
| 3,052,177 A * | 9/1962 | Lombardo | | 99/390 |
| 3,056,344 A * | 10/1962 | Miller | | 99/390 |
| 3,059,568 A * | 10/1962 | Fortis | | 99/340 |
| 3,060,918 A * | 10/1962 | Meyer | | 126/9 R |
| 3,068,852 A * | 12/1962 | Purtzer | | 126/25 R |
| 3,085,500 A * | 4/1963 | Russell | | 99/427 |
| 3,088,395 A * | 5/1963 | Miller | | 99/340 |
| 3,091,170 A * | 5/1963 | Wilson | | 99/340 |
| 3,101,080 A * | 8/1963 | Lorbacher | | 126/25 A |
| 3,105,483 A * | 10/1963 | Bryan | | 126/9 R |
| 3,106,295 A * | 10/1963 | Berlin | | 211/132.1 |
| 3,108,550 A * | 10/1963 | Knoblock | | 108/124 |
| 3,124,057 A * | 3/1964 | Kiser | | 99/340 |
| 3,139,845 A * | 7/1964 | Kolinski | | 108/119 |
| 3,145,289 A * | 8/1964 | Swetlitz | | 219/395 |
| 3,152,586 A * | 10/1964 | Russell | | 126/9 R |
| 3,182,585 A * | 5/1965 | Rensch et al. | | 99/340 |
| 3,191,592 A * | 6/1965 | Lorbacher | | 126/25 A |
| 3,196,871 A * | 7/1965 | Hormats et al. | | 128/205.28 |
| 3,224,389 A * | 12/1965 | Kent | | 108/119 |
| 3,236,998 A * | 2/1966 | Wertheimer et al. | | 219/524 |
| 3,247,811 A * | 4/1966 | Bauder | | 108/115 |
| 3,265,019 A * | 8/1966 | Haydock | | 108/119 |
| 3,267,925 A * | 8/1966 | Oatley | | 126/41 R |
| 3,272,346 A * | 9/1966 | Michaud | | 211/118 |
| 3,276,351 A * | 10/1966 | Sundholm | | 99/339 |
| 3,285,238 A * | 11/1966 | Norlie | | 126/9 R |
| 3,295,902 A * | 1/1967 | Doutt | | 312/108 |
| 3,298,301 A * | 1/1967 | Lowndes | | 99/340 |
| 3,302,555 A * | 2/1967 | Burwell | | 99/390 |
| 3,303,797 A * | 2/1967 | Mueller | | 108/63 |
| 3,308,807 A * | 3/1967 | Little et al. | | 126/275 R |
| 3,324,788 A * | 6/1967 | La France | | 99/389 |
| 3,327,698 A * | 6/1967 | Leslie | | 126/25 R |
| 3,337,983 A * | 8/1967 | Ebstein | | 446/482 |
| 3,345,959 A * | 10/1967 | Linstead | | 108/119 |
| 3,356,012 A * | 12/1967 | Rosen | | 99/446 |
| 3,358,585 A * | 12/1967 | Scherer | | 99/340 |
| 3,359,887 A * | 12/1967 | Cleveland | | 99/421 HV |
| 3,363,543 A * | 1/1968 | Roberts et al. | | 99/421 HV |
| 3,389,651 A * | 6/1968 | Schultz | | 99/393 |
| 3,410,441 A * | 11/1968 | Rhyne | | 220/4.28 |
| 3,421,433 A * | 1/1969 | Vitale | | 99/340 |
| 3,471,960 A * | 10/1969 | Taub | | 40/308 |
| 3,489,131 A * | 1/1970 | Richins | | 126/9 R |
| 3,495,524 A * | 2/1970 | Miles | | 99/399 |
| 3,503,324 A * | 3/1970 | Gmeiner | | 99/393 |
| 3,535,999 A * | 10/1970 | Chambon | | 99/340 |
| 3,543,672 A * | 12/1970 | Payonk | | 99/340 |
| 3,547,097 A * | 12/1970 | Rice et al. | | 126/4 |
| 3,550,525 A * | 12/1970 | Sabino | | 99/421 HH |
| 3,556,076 A * | 1/1971 | Stewart | | 126/9 R |
| 3,565,019 A * | 2/1971 | Bedol | | 108/120 |
| 3,581,654 A * | 6/1971 | Tescula | | 99/399 |
| 3,585,971 A * | 6/1971 | Muckelrath | | 122/140.1 |
| 3,593,768 A * | 7/1971 | Taub | | 206/466 |
| 3,611,648 A * | 10/1971 | Davis | | 2/2.17 |
| 3,611,912 A * | 10/1971 | Choc | | 99/340 |
| 3,613,659 A * | 10/1971 | Phillips | | 126/605 |
| 3,641,922 A * | 2/1972 | Nachazel et al. | | 99/340 |
| 3,667,446 A * | 6/1972 | Morton | | 126/9 R |
| 3,692,358 A * | 9/1972 | Sung | | 297/158.4 |
| 3,702,711 A * | 11/1972 | Beckley | | 96/181.2 |
| 3,717,137 A * | 2/1973 | Moline et al. | | 126/25 B |
| 3,732,803 A * | 5/1973 | Buxmann | | 99/357 |
| 3,742,838 A * | 7/1973 | Luschen et al. | | 99/389 |
| 3,742,839 A * | 7/1973 | Maley | | 99/421 HV |
| 3,760,155 A * | 9/1973 | Polansky | | 219/399 |
| 3,765,397 A * | 10/1973 | Henderson | | 126/25 R |
| 3,785,360 A * | 1/1974 | Martin | | 126/30 |
| 3,789,748 A * | 2/1974 | Rappoport et al. | | 99/340 |
| 3,791,370 A * | 2/1974 | Fauser | | 126/25 A |
| 3,802,727 A * | 4/1974 | Beckley | | 293/120 |
| 3,809,051 A * | 5/1974 | Giroux | | 126/9 R |
| 3,812,839 A * | 5/1974 | Helgeson | | 126/38 |
| D233,392 S * | 10/1974 | Hutchison | | D6/420 |
| 3,848,522 A * | 11/1974 | Trelc | | 99/421 H |
| 3,852,582 A * | 12/1974 | Lowell | | 362/6 |
| 3,856,374 A * | 12/1974 | Christen | | 312/263 |
| 3,880,139 A * | 4/1975 | Young | | 126/9 R |
| 3,886,851 A * | 6/1975 | Berner | | 454/192 |
| 3,899,961 A * | 8/1975 | Tanguy | | 99/340 |
| 3,906,848 A * | 9/1975 | Gow | | 99/339 |
| 3,937,227 A * | 2/1976 | Azumano | | 131/302 |
| 3,943,837 A * | 3/1976 | Trkla | | 99/339 |
| 3,954,068 A * | 5/1976 | Roberts et al. | | 105/124 |
| 3,960,196 A * | 6/1976 | Berner | | 160/222 |
| 3,999,472 A * | 12/1976 | Einto | | 99/340 |
| 4,020,323 A * | 4/1977 | Dills | | 219/405 |
| 4,042,057 A * | 8/1977 | Beckley | | 180/90 |
| D246,341 S * | 11/1977 | Boughton | | D6/487 |
| 4,069,806 A | 1/1978 | Landry | | |
| 4,072,092 A * | 2/1978 | Kohli et al. | | 99/389 |
| 4,083,559 A * | 4/1978 | Owen, Jr. | | 473/197 |
| 4,089,258 A * | 5/1978 | Berger | | 99/339 |
| 4,099,469 A * | 7/1978 | Sahli | | 108/1 |
| 4,105,271 A * | 8/1978 | Sebel et al. | | 312/280 |
| 4,106,473 A * | 8/1978 | Wandel | | 126/25 R |
| 4,120,237 A * | 10/1978 | Mecherlen | | 99/340 |
| 4,158,992 A * | 6/1979 | Malafouris | | 99/421 HV |
| 4,170,380 A * | 10/1979 | Raitport | | 296/68.1 |
| 4,194,949 A * | 3/1980 | Stark | | 202/180 |
| 4,196,675 A * | 4/1980 | Cook | | 108/6 |
| 4,210,121 A * | 7/1980 | Stark | | 126/573 |
| 4,231,253 A * | 11/1980 | Ohnhaus et al. | | 73/861.62 |
| 4,239,247 A * | 12/1980 | Hinz | | 280/19.1 |
| 4,245,505 A * | 1/1981 | Baynes | | 73/296 |
| 4,248,161 A * | 2/1981 | Adair et al. | | 108/6 |
| 4,249,516 A * | 2/1981 | Stark | | 126/601 |
| 4,250,815 A * | 2/1981 | Swanson | | 108/108 |
| 4,307,285 A * | 12/1981 | DeRemer | | 219/392 |
| 4,321,857 A * | 3/1982 | Best | | 99/340 |
| 4,329,789 A * | 5/1982 | Erickson | | 34/195 |
| 4,363,313 A * | 12/1982 | Smith | | 126/9 R |
| D268,391 S * | 3/1983 | Craco | | D7/332 |
| 4,393,857 A * | 7/1983 | Sanford | | 126/9 R |

| | | | | | | | | | |
|---|---|---|---|---|---|---|---|---|---|
| 4,413,609 | A | * | 11/1983 | Tisdale | 126/25 R | 5,261,388 | A | * | 11/1993 | Wright et al. | 126/41 R |
| 4,418,678 | A | * | 12/1983 | Erickson | 126/9 R | 5,272,825 | A | * | 12/1993 | Simpson | 38/137 |
| 4,436,024 | A | * | 3/1984 | Arden et al. | 99/421 HV | 5,279,010 | A | * | 1/1994 | Ferrand et al. | 5/600 |
| 4,444,323 | A | * | 4/1984 | Travis | 211/193 | 5,279,214 | A | * | 1/1994 | Lamendola | 99/445 |
| 4,462,306 | A | * | 7/1984 | Eisendrath | 99/340 | 5,313,928 | A | * | 5/1994 | Rodgers et al. | 126/38 |
| 4,475,528 | A | * | 10/1984 | Kuchenbrod | 126/9 A | 5,318,322 | A | * | 6/1994 | Home | 280/645 |
| 4,488,535 | A | * | 12/1984 | Johnson | 126/25 A | 5,333,540 | A | * | 8/1994 | Mazzocchi | 99/421 H |
| 4,489,706 | A | * | 12/1984 | Hait | 126/9 R | 5,353,715 | A | * | 10/1994 | Luyk | 108/116 |
| 4,508,094 | A | * | 4/1985 | Hait | 126/9 R | 5,355,782 | A | * | 10/1994 | Blanchard | 99/482 |
| 4,508,096 | A | * | 4/1985 | Slattery | 126/9 R | 5,358,204 | A | * | 10/1994 | Terada | 248/164 |
| 4,531,505 | A | * | 7/1985 | Hait et al. | 126/9 R | 5,404,864 | A | * | 4/1995 | Kent, Jr. | 126/9 B |
| 4,535,749 | A | * | 8/1985 | Schlosser et al. | 126/25 R | 5,429,043 | A | * | 7/1995 | Becker | 99/448 |
| 4,561,441 | A | * | 12/1985 | Kolodziej | 607/114 | 5,436,434 | A | * | 7/1995 | Baird | 219/734 |
| 4,572,062 | A | * | 2/1986 | Widdowson | 99/345 | 5,449,014 | A | * | 9/1995 | Yan-ho | 135/95 |
| 4,592,335 | A | * | 6/1986 | Beller | 126/25 A | 5,454,037 | A | * | 9/1995 | Pacella | 379/453 |
| 4,598,690 | A | * | 7/1986 | Hsu | 126/25 R | 5,460,159 | A | * | 10/1995 | Bussey | 126/25 R |
| D284,929 | S | * | 8/1986 | Schlosser et al. | D7/332 | 5,472,270 | A | * | 12/1995 | Czarnecky et al. | 312/265.6 |
| D285,161 | S | * | 8/1986 | Cairns | D7/334 | 5,478,138 | A | * | 12/1995 | Yu | 297/461 |
| 4,603,906 | A | * | 8/1986 | Mathiesen | 297/440.23 | 5,480,335 | A | * | 1/1996 | Caveza | 446/75 |
| 4,619,190 | A | * | 10/1986 | Smith | 99/393 | 5,483,901 | A | * | 1/1996 | Tisbo et al. | 108/119 |
| RE32,288 | E | * | 11/1986 | Berger | 99/385 | 5,485,816 | A | * | 1/1996 | Cox et al. | 126/25 R |
| 4,621,608 | A | * | 11/1986 | Lee | 126/9 R | 5,491,940 | A | * | 2/1996 | Bruchu | 52/213 |
| 4,624,238 | A | * | 11/1986 | Hait | 126/9 R | 5,555,684 | A | * | 9/1996 | Galowitz et al. | 52/204.5 |
| 4,627,410 | A | * | 12/1986 | Jung | 126/25 A | 5,575,195 | A | * | 11/1996 | Foxford | 99/340 |
| 4,646,711 | A | * | 3/1987 | Oliphant | 126/9 R | 5,588,355 | A | * | 12/1996 | Mead et al. | 99/449 |
| D290,923 | S | * | 7/1987 | Erickson | D7/337 | 5,598,834 | A | * | 2/1997 | Grady | 126/506 |
| 4,686,910 | A | * | 8/1987 | Skjerseth | 108/118 | 5,603,267 | A | * | 2/1997 | Soper | 108/124 |
| 4,688,542 | A | * | 8/1987 | Isbell | 126/25 A | 5,603,585 | A | * | 2/1997 | Bruchu et al. | 403/382 |
| 4,688,543 | A | * | 8/1987 | Kopke | 126/25 A | D381,552 | S | * | 7/1997 | Pizzey et al. | D7/332 |
| D291,648 | S | * | 9/1987 | Pring | D7/403 | 5,644,994 | A | * | 7/1997 | Liang et al. | 108/116 |
| 4,690,125 | A | * | 9/1987 | Beller | 126/25 A | 5,645,279 | A | * | 7/1997 | Reutlinger | 273/249 |
| 4,696,282 | A | * | 9/1987 | Incitti | 126/9 R | 5,645,332 | A | * | 7/1997 | Snoke et al. | 312/257.1 |
| 4,707,038 | A | * | 11/1987 | Voegeli | 312/265.5 | 5,645,693 | A | * | 7/1997 | Gode | 202/173 |
| 4,721,037 | A | * | 1/1988 | Blosnich | 99/482 | 5,655,437 | A | * | 8/1997 | Vitacca | 99/400 |
| 4,722,285 | A | * | 2/1988 | Goodman | 109/50 | 5,657,004 | A | * | 8/1997 | Whittaker et al. | 340/815.45 |
| 4,726,349 | A | * | 2/1988 | Gehrke | 126/25 R | 5,667,066 | A | * | 9/1997 | Simpson | 206/278 |
| 4,741,321 | A | * | 5/1988 | Squires | 126/9 R | 5,676,048 | A | * | 10/1997 | Schroeter et al. | 99/385 |
| 4,770,091 | A | * | 9/1988 | Vaughn | 99/421 H | 5,678,491 | A | * | 10/1997 | Price et al. | 108/115 |
| 4,782,813 | A | * | 11/1988 | Kopke | 126/25 A | 5,685,147 | A | * | 11/1997 | Brassea | 60/496 |
| 4,799,436 | A | * | 1/1989 | Goodman | 109/50 | 5,695,094 | A | * | 12/1997 | Burnham et al. | 222/146.1 |
| 4,829,977 | A | * | 5/1989 | Valentine | 126/9 R | 5,706,846 | A | * | 1/1998 | Sutton | 135/128 |
| 4,840,118 | A | * | 6/1989 | Rinehart | 99/446 | 5,713,344 | A | * | 2/1998 | Gilbert | 126/29 |
| 4,862,526 | A | * | 9/1989 | Berger | 4/536 | D391,799 | S | * | 3/1998 | Haring et al. | D7/338 |
| 4,877,010 | A | * | 10/1989 | Hait | 126/9 A | 5,722,388 | A | * | 3/1998 | Butow et al. | 126/25 R |
| 4,884,551 | A | * | 12/1989 | Hait | 126/9 R | 5,725,119 | A | * | 3/1998 | Bradford et al. | 220/6 |
| 4,903,683 | A | * | 2/1990 | Larsen et al. | 126/25 B | 5,732,510 | A | * | 3/1998 | Sutton et al. | 52/1 |
| 4,924,844 | A | * | 5/1990 | Bransburg | 126/9 R | 5,755,153 | A | * | 5/1998 | Su | 99/395 |
| 4,926,838 | A | * | 5/1990 | Sells et al. | 126/25 A | 5,782,168 | A | * | 7/1998 | Krhnak | 99/340 |
| RE33,263 | E | * | 7/1990 | Goodman | 109/50 | 5,785,046 | A | * | 7/1998 | Colla | 126/9 R |
| 4,971,045 | A | * | 11/1990 | Probst | 126/65 | 5,802,640 | A | * | 9/1998 | Ferrand et al. | 5/617 |
| 4,979,436 | A | * | 12/1990 | McGowan | 99/340 | 5,809,714 | A | * | 9/1998 | Kurrasch et al. | 52/239 |
| 4,983,809 | A | * | 1/1991 | Maiette et al. | 392/407 | 5,809,989 | A | * | 9/1998 | Nelson | 126/544 |
| 4,996,970 | A | * | 3/1991 | Legare | 126/205 | 5,823,174 | A | * | 10/1998 | Andress | 126/25 A |
| 5,001,971 | A | * | 3/1991 | Beller | 99/421 H | 5,832,915 | A | * | 11/1998 | Skidmore et al. | 126/9 R |
| 5,029,938 | A | * | 7/1991 | Song | 297/158.4 | 5,837,095 | A | * | 11/1998 | Bruchu et al. | 156/499 |
| 5,031,602 | A | * | 7/1991 | Vick | 126/25 R | 5,839,360 | A | * | 11/1998 | Williams | 99/408 |
| 5,033,449 | A | * | 7/1991 | Hanagan | 126/39 BA | D402,155 | S | * | 12/1998 | McDew | D7/354 |
| 5,050,577 | A | * | 9/1991 | Baynes et al. | 126/9 R | 5,845,563 | A | * | 12/1998 | Haring et al. | 99/419 |
| 5,076,177 | A | * | 12/1991 | Chien | 108/180 | D406,009 | S | * | 2/1999 | Wagner et al. | D7/402 |
| D323,096 | S | * | 1/1992 | Pack | D7/409 | 5,868,081 | A | * | 2/1999 | Raab | 108/161 |
| 5,086,752 | A | * | 2/1992 | Hait | 126/9 R | 5,868,263 | A | * | 2/1999 | McAllister et al. | 211/90.01 |
| 5,099,821 | A | * | 3/1992 | Ceravolo | 126/25 R | 5,878,739 | A | * | 3/1999 | Guidry | 126/25 R |
| 5,103,799 | A | * | 4/1992 | Atanasio | 126/9 R | 5,885,513 | A | * | 3/1999 | Louderback et al. | 264/459 |
| 5,105,726 | A | * | 4/1992 | Lisker | 99/340 | 5,887,581 | A | * | 3/1999 | Wasko | 126/25 A |
| 5,119,799 | A | | 6/1992 | Cowan | | D408,167 | S | * | 4/1999 | Cloud | D6/397 |
| 5,129,312 | A | * | 7/1992 | Berger | 99/340 | 5,893,604 | A | * | 4/1999 | Yao | 297/16.1 |
| D328,548 | S | * | 8/1992 | Christie | D7/335 | 5,896,808 | A | * | 4/1999 | Graur | 99/331 |
| 5,136,933 | A | * | 8/1992 | Derakhshan | 99/421 P | D409,435 | S | * | 5/1999 | Husted | D7/332 |
| D330,991 | S | * | 11/1992 | Christie | D7/335 | D409,877 | S | * | 5/1999 | Husted | D7/402 |
| 5,163,358 | A | * | 11/1992 | Hanagan et al. | 99/339 | 5,906,016 | A | * | 5/1999 | Ferrand et al. | 5/600 |
| 5,163,414 | A | * | 11/1992 | Haynes, Jr. | 126/25 R | 5,906,017 | A | * | 5/1999 | Ferrand et al. | 5/617 |
| 5,186,159 | A | * | 2/1993 | Crow et al. | 126/41 R | 5,906,196 | A | * | 5/1999 | Measom | 126/304 A |
| D333,588 | S | * | 3/1993 | Bergman | D7/332 | D411,779 | S | * | 7/1999 | Husted | D7/332 |
| D333,941 | S | * | 3/1993 | Hait | D7/335 | D411,782 | S | * | 7/1999 | Husted | D7/402 |
| 5,195,425 | A | * | 3/1993 | Koziol | 99/421 H | 5,928,599 | A | * | 7/1999 | Laphan et al. | 264/516 |
| 5,217,288 | A | * | 6/1993 | Johnson | 312/257.1 | 5,934,180 | A | * | 8/1999 | Lin | 99/340 |
| 5,243,961 | A | * | 9/1993 | Harris | 126/9 R | 5,947,007 | A | * | 9/1999 | O'Grady et al. | 99/340 |
| 5,244,579 | A | * | 9/1993 | Horner et al. | 210/652 | 5,960,788 | A | * | 10/1999 | Bach et al. | 126/506 |
| 5,249,763 | A | * | 10/1993 | Weber et al. | 248/27.1 | 5,971,511 | A | * | 10/1999 | Diebel et al. | 312/265.3 |

| | | | | | | | | | |
|---|---|---|---|---|---|---|---|---|---|
| D416,148 | S | * | 11/1999 | Pagnon et al. .................. D6/487 | 6,476,863 | B1 | * | 11/2002 | Silverbrook ............... 348/231.9 |
| 5,980,449 | A | * | 11/1999 | Benson et al. .................. 600/22 | 6,497,738 | B2 | * | 12/2002 | Lin ............................ 55/385.1 |
| 5,983,887 | A | | 11/1999 | Bourgeois ..................... 126/274 | 6,509,549 | B1 | * | 1/2003 | Chasen et al. ............... 219/386 |
| 5,992,406 | A | * | 11/1999 | Lelle ............................ 126/33 | D469,994 | S | * | 2/2003 | Smith ........................... D6/499 |
| 6,000,388 | A | * | 12/1999 | Andress ...................... 126/25 R | D469,996 | S | * | 2/2003 | Ashby ........................... D6/511 |
| 6,007,170 | A | * | 12/1999 | Liebertz et al. ............... 312/263 | D470,352 | S | * | 2/2003 | Strong .......................... D6/511 |
| 6,009,797 | A | * | 1/2000 | Lin ............................ 99/421 H | 6,518,549 | B1 | * | 2/2003 | Taylor et al. ............... 219/450.1 |
| 6,012,444 | A | * | 1/2000 | Skender ..................... 126/41 R | 6,523,463 | B1 | * | 2/2003 | Hogle ............................ 99/482 |
| 6,019,050 | A | * | 2/2000 | Ranta ............................ 108/6 | 6,530,134 | B1 | * | 3/2003 | Laphan et al. .................... 27/7 |
| 6,035,768 | A | | 3/2000 | Kaufman | 6,536,334 | B2 | * | 3/2003 | Backus et al. ............. 99/421 H |
| 6,038,965 | A | * | 3/2000 | Thorndyke ................... 99/340 | 6,536,359 | B2 | * | 3/2003 | Liu ............................... 108/118 |
| 6,039,417 | A | * | 3/2000 | Snoke et al. ............... 312/257.1 | 6,542,645 | B1 | * | 4/2003 | Silverbrook et al. ......... 382/254 |
| D422,172 | S | * | 4/2000 | Hsu .............................. D7/350.1 | 6,543,435 | B1 | * | 4/2003 | Regen et al. ............... 126/25 R |
| D423,280 | S | * | 4/2000 | Lin ................................ D7/363 | 6,547,364 | B2 | * | 4/2003 | Silverbrook ..................... 347/19 |
| 6,047,633 | A | * | 4/2000 | Khaytman .................. 99/421 V | 6,550,404 | B2 | * | 4/2003 | Stanford ........................ 108/132 |
| 6,062,410 | A | * | 5/2000 | Bradford et al. .................. 220/6 | 6,550,879 | B1 | * | 4/2003 | Kurrasch et al. ........... 312/257.1 |
| 6,073,542 | A | | 6/2000 | Perez | 6,554,791 | B1 | * | 4/2003 | Cartledge et al. ............. 604/67 |
| 6,082,351 | A | * | 7/2000 | Faraj ......................... 126/41 R | 6,561,601 | B1 | * | 5/2003 | Maffeo ...................... 312/257.1 |
| 6,082,693 | A | * | 7/2000 | Benson et al. ................. 248/284.1 | 6,565,181 | B2 | * | 5/2003 | Silverbrook ..................... 347/19 |
| 6,089,220 | A | * | 7/2000 | Faraj ......................... 126/41 R | 6,568,315 | B2 | * | 5/2003 | Backus et al. ............. 99/421 H |
| 6,112,674 | A | * | 9/2000 | Stanford ..................... 108/132 | 6,568,316 | B1 | * | 5/2003 | Backus et al. ............. 99/421 H |
| D432,852 | S | * | 10/2000 | Mosher et al. ................. D7/337 | 6,589,470 | B2 | * | 7/2003 | Fried et al. .................... 264/443 |
| 6,125,835 | A | * | 10/2000 | Montano ..................... 126/9 R | 6,591,828 | B1 | * | 7/2003 | Schneider ................... 126/9 R |
| 6,131,505 | A | * | 10/2000 | Lin ............................... 99/340 | 6,591,831 | B2 | * | 7/2003 | Reynolds ....................... 126/33 |
| 6,131,560 | A | * | 10/2000 | Healy ......................... 131/366 | D478,463 | S | * | 8/2003 | Mouly .......................... D7/334 |
| 6,132,666 | A | * | 10/2000 | Foley et al. ................. 264/313 | 6,606,986 | B2 | * | 8/2003 | Holland et al. .............. 126/25 R |
| 6,135,014 | A | * | 10/2000 | Chang ........................ 99/339 | 6,606,987 | B2 | * | 8/2003 | DeMars ....................... 126/38 |
| 6,142,066 | A | * | 11/2000 | Anders et al. .................. 99/482 | D479,092 | S | * | 9/2003 | Lewis et al. .................. D7/332 |
| 6,146,578 | A | * | 11/2000 | Van Ert et al. ............... 264/510 | 6,618,117 | B2 | * | 9/2003 | Silverbrook ..................... 355/18 |
| 6,152,552 | A | * | 11/2000 | Snoke et al. ............... 312/257.1 | 6,636,216 | B1 | * | 10/2003 | Silverbrook et al. ........... 345/422 |
| D436,284 | S | * | 1/2001 | Mak .............................. D7/332 | D481,567 | S | * | 11/2003 | Ashby et al. .................. D6/499 |
| 6,182,560 | B1 | * | 2/2001 | Andress ......................... 99/400 | 6,644,771 | B1 | * | 11/2003 | Silverbrook ..................... 347/19 |
| 6,194,689 | B1 | * | 2/2001 | Griffiths et al. ............... 219/450.1 | 6,651,568 | B1 | * | 11/2003 | Buono ........................... 108/127 |
| 6,196,116 | B1 | * | 3/2001 | O'Grady et al. ................ 99/330 | 6,655,633 | B1 | * | 12/2003 | Chapman, Jr. ............... 244/123.9 |
| 6,209,269 | B1 | * | 4/2001 | Valderrama ................. 52/171.3 | 6,658,991 | B2 | * | 12/2003 | Backus et al. .................... 99/395 |
| 6,213,004 | B1 | * | 4/2001 | Franco ....................... 99/421 H | 6,665,454 | B1 | * | 12/2003 | Silverbrook et al. ........... 382/299 |
| 6,217,165 | B1 | * | 4/2001 | Silverbrook ................. 347/86 | 6,668,408 | B2 | * | 12/2003 | Ferrand et al. ..................... 5/710 |
| 6,220,240 | B1 | * | 4/2001 | Grady et al. ................. 126/519 | 6,672,303 | B1 | * | 1/2004 | Emter ......................... 126/41 R |
| 6,230,916 | B1 | * | 5/2001 | Bradford et al. .................. 220/6 | 6,681,757 | B1 | * | 1/2004 | Rivero ......................... 126/9 R |
| D443,462 | S | * | 6/2001 | Pai ................................ D7/332 | 6,682,111 | B1 | * | 1/2004 | Houseman et al. .......... 293/115 |
| 6,263,783 | B1 | * | 7/2001 | Liu ................................ 99/339 | 6,688,000 | B2 | * | 2/2004 | Wang et al. ................... 29/897.2 |
| 6,302,097 | B1 | * | 10/2001 | Rivera ......................... 126/38 | 6,702,417 | B2 | * | 3/2004 | Silverbrook ..................... 347/19 |
| 6,315,200 | B1 | * | 11/2001 | Silverbrook et al. ......... 235/454 | 6,702,438 | B2 | * | 3/2004 | Codos et al. .................. 347/106 |
| 6,317,192 | B1 | * | 11/2001 | Silverbrook et al. ......... 355/18 | 6,705,210 | B1 | * | 3/2004 | Leonard ........................ 99/413 |
| 6,327,800 | B1 | * | 12/2001 | Daams ......................... 38/137 | 6,708,604 | B1 | * | 3/2004 | Deichler, Jr. ................... 99/482 |
| 6,327,994 | B1 | * | 12/2001 | Labrador ..................... 114/382 | 6,726,317 | B2 | * | 4/2004 | Codos ........................... 347/106 |
| 6,330,852 | B1 | * | 12/2001 | Williams ...................... 99/408 | 6,736,051 | B2 | * | 5/2004 | Frantz et al. .................... 99/349 |
| 6,330,853 | B1 | * | 12/2001 | Yu ............................ 99/421 H | 6,736,132 | B2 | * | 5/2004 | Schlosser et al. ............. 126/512 |
| 6,338,618 | B1 | * | 1/2002 | Van Ert et al. .................... 425/3 | D491,414 | S | * | 6/2004 | Nichols et al. ................ D7/402 |
| 6,354,195 | B1 | * | 3/2002 | Huang ...................... 99/421 H | 6,742,445 | B2 | * | 6/2004 | Backus et al. ............. 99/421 H |
| 6,356,715 | B1 | * | 3/2002 | Silverbrook ................. 396/284 | 6,742,446 | B2 | * | 6/2004 | McLemore et al. ........ 99/421 V |
| 6,357,344 | B2 | * | 3/2002 | O'Grady et al. ................ 99/340 | 6,742,513 | B1 | * | 6/2004 | Ball et al. ..................... 126/25 R |
| 6,362,868 | B1 | * | 3/2002 | Silverbrook ................. 355/18 | 6,745,673 | B2 | * | 6/2004 | Martinez ...................... 99/421 H |
| 6,362,869 | B1 | * | 3/2002 | Silverbrook ................. 355/18 | 6,750,901 | B1 | * | 6/2004 | Silverbrook .................. 348/207.2 |
| 6,363,842 | B1 | * | 4/2002 | Lin ............................... 99/425 | 6,750,944 | B2 | * | 6/2004 | Silverbrook et al. ........... 355/18 |
| 6,370,905 | B1 | * | 4/2002 | Chapman ..................... 62/404 | 6,755,187 | B2 | * | 6/2004 | Harrod et al. ................ 126/25 R |
| 6,384,380 | B1 | * | 5/2002 | Faries et al. .................. 219/438 | 6,766,730 | B2 | * | 7/2004 | Wrenn ............................ 99/345 |
| D458,078 | S | * | 6/2002 | Lin ................................ D7/362 | 6,782,805 | B2 | * | 8/2004 | Backus et al. ............. 99/421 H |
| D458,671 | S | * | 6/2002 | Lin .............................. D23/372 | 6,782,806 | B2 | * | 8/2004 | Backus et al. ................. 99/427 |
| 6,401,630 | B1 | * | 6/2002 | Peterson ....................... 108/12 | 6,786,420 | B1 | * | 9/2004 | Silverbrook ................... 235/494 |
| 6,405,641 | B1 | * | 6/2002 | Harbin .......................... 99/339 | 6,788,336 | B1 | * | 9/2004 | Silverbrook ................ 348/207.2 |
| 6,408,742 | B1 | * | 6/2002 | Backus et al. ............. 99/421 H | 6,803,989 | B2 | * | 10/2004 | Silverbrook ................... 355/18 |
| 6,409,292 | B1 | * | 6/2002 | Janowitz ...................... 312/257.1 | 6,820,950 | B1 | * | 11/2004 | Sun ............................ 312/108 |
| 6,409,293 | B1 | * | 6/2002 | Chang ......................... 312/257.1 | 6,827,078 | B2 | * | 12/2004 | Price ............................ 126/38 |
| 6,413,458 | B1 | * | 7/2002 | Pearce ........................ 264/141 | 6,831,681 | B1 | * | 12/2004 | Silverbrook ................ 348/207.2 |
| 6,415,054 | B1 | * | 7/2002 | Silverbrook et al. ......... 382/233 | 6,837,150 | B2 | * | 1/2005 | Backus et al. ............. 99/421 H |
| 6,416,154 | B1 | * | 7/2002 | Silverbrook ................. 347/19 | 6,845,769 | B2 | * | 1/2005 | Chen .......................... 126/9 R |
| 6,431,669 | B1 | * | 8/2002 | Silverbrook .................. 347/2 | 6,848,746 | B2 | * | 2/2005 | Gentry ........................... 297/380 |
| 6,436,564 | B1 | * | 8/2002 | Witzigreuter et al. ............ 429/27 | 6,850,274 | B1 | * | 2/2005 | Silverbrook et al. ........... 348/239 |
| 6,437,291 | B1 | * | 8/2002 | Hopponen ................... 219/395 | 6,857,719 | B2 | * | 2/2005 | Silverbrook .................... 347/17 |
| 6,438,776 | B2 | * | 8/2002 | Ferrand et al. .................... 5/600 | 6,863,063 | B2 | * | 3/2005 | Yeh ........................... 126/25 R |
| 6,439,111 | B1 | * | 8/2002 | Lu ............................... 99/449 | 6,866,035 | B2 | * | 3/2005 | Haemerle ................... 126/214 D |
| 6,439,221 | B1 | * | 8/2002 | Ward et al. .................. 126/25 R | 6,874,408 | B2 | * | 4/2005 | Backus et al. .................... 99/327 |
| 6,439,225 | B2 | * | 8/2002 | Bach et al. ..................... 126/519 | 6,879,341 | B1 | * | 4/2005 | Silverbrook ................. 348/231.6 |
| 6,442,525 | B1 | * | 8/2002 | Silverbrook et al. ........... 705/50 | 6,908,223 | B2 | * | 6/2005 | Bibbo et al. .................... 366/333 |
| 6,450,087 | B2 | * | 9/2002 | Backus et al. ................ 99/427 | 6,910,476 | B2 | * | 6/2005 | Johnson et al. ............. 126/41 R |
| 6,457,401 | B2 | * | 10/2002 | Witzel .......................... 99/401 | 6,913,011 | B1 | * | 7/2005 | Snider .......................... 126/9 R |
| 6,459,495 | B1 | * | 10/2002 | Silverbrook .................. 358/520 | 6,913,458 | B2 | * | 7/2005 | Mosher et al. ................. 432/222 |
| 6,467,898 | B1 | * | 10/2002 | Codos et al. ................ 347/102 | 6,918,542 | B2 | * | 7/2005 | Silverbrook et al. ........... 235/494 |

| | | | |
|---|---|---|---|
| 6,923,110 B2 * | 8/2005 | Alazet | 99/340 |
| 6,923,567 B2 * | 8/2005 | Bibbo et al. | 366/149 |
| 6,931,985 B1 * | 8/2005 | Attie | 99/340 |
| 6,935,326 B1 * | 8/2005 | Willis | 126/9 R |
| 6,941,598 B2 * | 9/2005 | Ferrand et al. | 5/600 |
| 6,942,637 B2 * | 9/2005 | Cartledge et al. | 604/67 |
| 6,945,064 B2 * | 9/2005 | Jebaraj | 62/259.1 |
| 6,948,661 B2 * | 9/2005 | Silverbrook et al. | 235/462.1 |
| 6,953,235 B2 * | 10/2005 | Silverbrook | 347/19 |
| 6,954,254 B2 * | 10/2005 | Silverbrook | 355/18 |
| D511,259 S * | 11/2005 | Winter | D6/499 |
| D511,913 S * | 11/2005 | Kearl et al. | D6/487 |
| D511,934 S * | 11/2005 | Grady et al. | D7/402 |
| D512,158 S * | 11/2005 | Schlosser et al. | D25/33 |
| 6,974,609 B2 * | 12/2005 | Engle et al. | 428/32.2 |
| 6,976,485 B2 * | 12/2005 | Johnson et al. | 126/41 R |
| 6,981,794 B2 * | 1/2006 | Bibbo et al. | 366/149 |
| 6,986,562 B2 * | 1/2006 | Silverbrook | 347/19 |
| D516,699 S * | 3/2006 | Schlosser et al. | D23/398 |
| 7,007,852 B2 * | 3/2006 | Silverbrook et al. | 235/487 |
| 7,021,203 B2 * | 4/2006 | Backus et al. | 99/421 H |
| D520,298 S * | 5/2006 | Huegerich et al. | D7/402 |
| 7,036,559 B2 * | 5/2006 | Stanimirovic | 165/11.1 |
| 7,037,036 B2 * | 5/2006 | Strassman | 404/95 |
| 7,044,050 B1 * | 5/2006 | Cook | 99/482 |
| 7,044,589 B2 * | 5/2006 | Silverbrook | 347/86 |
| 7,050,143 B1 * | 5/2006 | Silverbrook et al. | 355/18 |
| 7,052,103 B2 * | 5/2006 | Silverbrook | 347/19 |
| 7,055,927 B2 * | 6/2006 | Silverbrook | 347/19 |
| 7,060,213 B2 * | 6/2006 | Pearce | 264/176.1 |
| 7,063,763 B2 * | 6/2006 | Chapman, Jr. | 156/175 |
| 7,073,713 B2 * | 7/2006 | Silverbrook et al. | 235/462.01 |
| 7,073,902 B2 * | 7/2006 | Codos et al. | 347/102 |
| 7,076,822 B2 * | 7/2006 | Pearce | 5/655.5 |
| 7,080,640 B2 * | 7/2006 | Sanders et al. | 126/30 |
| 7,083,108 B2 * | 8/2006 | Silverbrook et al. | 235/494 |
| 7,084,951 B2 * | 8/2006 | Silverbrook | 355/18 |
| 7,089,099 B2 * | 8/2006 | Shostak et al. | 701/32 |
| 7,092,011 B2 * | 8/2006 | Silverbrook et al. | 348/207.2 |
| 7,097,104 B2 * | 8/2006 | Silverbrook et al. | 235/462.41 |
| 7,100,834 B2 * | 9/2006 | Silverbrook et al. | 235/487 |
| 7,103,460 B1 * | 9/2006 | Breed | 701/29 |
| 7,108,712 B2 * | 9/2006 | Barghelame | 607/91 |
| 7,110,139 B2 * | 9/2006 | Silverbrook | 358/1.8 |
| 7,117,865 B2 * | 10/2006 | Siegel et al. | 126/26 |
| 7,119,836 B2 * | 10/2006 | Silverbrook | 348/207.2 |
| 7,121,274 B2 * | 10/2006 | Wishart | 126/57 |
| 7,128,386 B2 * | 10/2006 | Silverbrook | 347/19 |
| 7,140,726 B2 * | 11/2006 | Silverbrook | 347/101 |
| 7,150,220 B2 * | 12/2006 | Han et al. | 99/400 |
| 7,151,447 B1 * | 12/2006 | Willms et al. | 340/540 |
| 7,152,939 B2 * | 12/2006 | Silverbrook | 347/19 |
| 7,155,395 B2 * | 12/2006 | Silverbrook | 705/1.1 |
| 7,160,316 B2 * | 1/2007 | Hamilton et al. | 607/111 |
| 7,163,273 B2 * | 1/2007 | Silverbrook | 347/19 |
| 7,168,459 B2 * | 1/2007 | Bibbo et al. | 141/5 |
| D536,918 S * | 2/2007 | Wood | D7/334 |
| 7,187,404 B2 * | 3/2007 | Silverbrook et al. | 348/207.2 |
| 7,193,482 B2 * | 3/2007 | Silverbrook | 331/78 |
| 7,201,319 B2 * | 4/2007 | Silverbrook et al. | 235/454 |
| 7,209,160 B2 * | 4/2007 | McNelley et al. | 348/14.16 |
| 7,214,055 B2 * | 5/2007 | Meister et al. | 431/347 |
| 7,222,619 B2 * | 5/2007 | DeMars | 126/38 |
| 7,225,729 B2 * | 6/2007 | Backus et al. | 99/339 |
| 7,225,730 B2 * | 6/2007 | Backus et al. | 99/419 |
| 7,233,421 B2 * | 6/2007 | Silverbrook | 358/509 |
| 7,234,645 B2 * | 6/2007 | Silverbrook | 235/494 |
| 7,234,801 B2 * | 6/2007 | Silverbrook | 347/86 |
| D547,848 S * | 7/2007 | Grady et al. | D23/343 |
| 7,237,548 B2 * | 7/2007 | Mizrahi et al. | 126/9 R |
| 7,255,414 B2 * | 8/2007 | Silverbrook | 347/19 |
| 7,263,988 B2 * | 9/2007 | Viers | 126/25 A |
| 7,263,991 B2 * | 9/2007 | Schlosser et al. | 126/512 |
| 7,275,800 B2 * | 10/2007 | Silverbrook | 347/19 |
| 7,278,723 B2 * | 10/2007 | Silverbrook | 347/86 |
| 7,281,786 B2 * | 10/2007 | Silverbrook | 347/86 |
| 7,283,162 B2 * | 10/2007 | Silverbrook et al. | 348/239 |
| 7,284,393 B1 * | 10/2007 | Macmillan | 62/457.7 |
| 7,287,702 B2 * | 10/2007 | Silverbrook et al. | 235/475 |
| 7,289,142 B2 * | 10/2007 | Silverbrook | 348/221.1 |
| 7,289,156 B2 * | 10/2007 | Silverbrook et al. | 348/374 |
| D554,944 S * | 11/2007 | Wood | D7/402 |
| 7,301,127 B1 * | 11/2007 | Derridinger, Jr. | 219/386 |
| D557,066 S * | 12/2007 | Chau et al. | D7/402 |
| D557,067 S * | 12/2007 | Ho et al. | D7/402 |
| D557,068 S * | 12/2007 | Lee | D7/402 |
| D557,555 S * | 12/2007 | Chau et al. | D7/402 |
| D557,556 S * | 12/2007 | Chau et al. | D7/402 |
| D557,557 S * | 12/2007 | Chau et al. | D7/402 |
| D557,558 S * | 12/2007 | Chau et al. | D7/402 |
| 7,311,257 B2 * | 12/2007 | Silverbrook | 235/454 |
| 7,311,691 B2 * | 12/2007 | Cartledge et al. | 604/65 |
| 7,312,845 B2 * | 12/2007 | Silverbrook | 355/18 |
| 7,313,467 B2 * | 12/2007 | Breed et al. | 701/1 |
| D558,518 S * | 1/2008 | Ho et al. | D7/402 |
| D560,415 S * | 1/2008 | Wood et al. | D7/334 |
| D560,416 S * | 1/2008 | Sedberry et al. | D7/334 |
| D560,417 S * | 1/2008 | Ho et al. | D7/334 |
| D560,418 S * | 1/2008 | Chau et al. | D7/334 |
| D560,419 S * | 1/2008 | Lockhart et al. | D7/334 |
| 7,320,332 B2 * | 1/2008 | Reis | 135/115 |
| 7,323,663 B2 * | 1/2008 | Cavada et al. | 219/411 |
| D562,629 S * | 2/2008 | Chau et al. | D7/402 |
| D562,630 S * | 2/2008 | Chau et al. | D7/402 |
| 7,325,897 B2 * | 2/2008 | Silverbrook | 347/19 |
| 7,331,278 B2 * | 2/2008 | Stokes, Jr. | 99/401 |
| 7,335,858 B2 * | 2/2008 | Cavada et al. | 219/386 |
| D563,150 S * | 3/2008 | Chau et al. | D7/334 |
| 7,341,201 B2 * | 3/2008 | Stanimirovic | 236/49.1 |
| 7,362,971 B2 * | 4/2008 | Silverbrook et al. | 396/429 |
| 7,373,083 B2 * | 5/2008 | Silverbrook et al. | 396/310 |
| 7,377,706 B2 * | 5/2008 | Silverbrook et al. | 400/613 |
| 7,379,800 B2 * | 5/2008 | Breed | 701/29 |
| 7,391,435 B2 * | 6/2008 | Silverbrook | 348/207.2 |
| D572,973 S * | 7/2008 | Chau | D7/402 |
| 7,424,849 B2 * | 9/2008 | Backus et al. | 99/421 H |
| 7,426,928 B2 * | 9/2008 | Sanders et al. | 126/30 |
| 7,427,101 B1 * | 9/2008 | Zernov | 297/184.14 |
| D578,334 S * | 10/2008 | Abrahams | D7/334 |
| 7,438,071 B2 * | 10/2008 | Johnson et al. | 126/25 R |
| 7,443,434 B2 * | 10/2008 | Silverbrook | 348/294 |
| 7,444,210 B2 * | 10/2008 | Breed et al. | 701/1 |
| 7,451,709 B2 * | 11/2008 | Swartfager et al. | 108/14 |
| 7,452,048 B2 * | 11/2008 | Silverbrook | 347/16 |
| 7,453,492 B2 * | 11/2008 | Silverbrook | 348/207.2 |
| 7,456,861 B2 * | 11/2008 | Silverbrook | 348/207.2 |
| 7,458,114 B2 * | 12/2008 | Troutman | 5/93.1 |
| 7,460,152 B2 * | 12/2008 | Silverbrook et al. | 348/207.2 |
| 7,461,931 B2 * | 12/2008 | Silverbrook | 347/101 |
| D584,562 S * | 1/2009 | Chau et al. | D7/334 |
| 7,475,825 B2 * | 1/2009 | Silverbrook et al. | 235/494 |
| 7,483,050 B2 * | 1/2009 | Silverbrook et al. | 348/207.2 |
| 7,483,053 B2 * | 1/2009 | Silverbrook | 348/207.2 |
| 7,492,490 B2 * | 2/2009 | Silverbrook | 358/474 |
| D587,525 S * | 3/2009 | Chau | D7/402 |
| 7,505,068 B2 * | 3/2009 | Silverbrook | 348/222.1 |
| 7,511,744 B2 * | 3/2009 | Silverbrook et al. | 348/239 |
| 7,514,651 B2 * | 4/2009 | Popeil et al. | 219/392 |
| 7,517,071 B2 * | 4/2009 | Silverbrook | 347/86 |
| 7,524,045 B2 * | 4/2009 | Silverbrook et al. | 347/85 |
| 7,524,047 B2 * | 4/2009 | Silverbrook | 347/86 |
| 7,527,209 B2 * | 5/2009 | Silverbrook | 235/494 |
| 7,559,472 B2 * | 7/2009 | Silverbrook et al. | 235/462.01 |
| 7,575,313 B2 * | 8/2009 | Silverbrook | 347/86 |
| 7,581,826 B2 * | 9/2009 | Silverbrook | 347/86 |
| 7,602,423 B2 * | 10/2009 | Silverbrook | 348/231.6 |
| 7,612,735 B2 * | 11/2009 | Essig et al. | 343/915 |
| 7,621,607 B2 * | 11/2009 | Silverbrook | 347/2 |
| 7,629,999 B2 * | 12/2009 | Silverbrook | 348/207.2 |
| 7,631,966 B2 * | 12/2009 | Silverbrook et al. | 347/108 |
| 7,654,626 B2 * | 2/2010 | Silverbrook et al. | 347/2 |
| 7,665,834 B2 * | 2/2010 | Silverbrook | 347/86 |
| D612,190 S * | 3/2010 | Tenney et al. | D7/332 |
| 7,672,756 B2 * | 3/2010 | Breed | 701/1 |
| 7,701,506 B2 * | 4/2010 | Silverbrook | 348/374 |
| D616,243 S * | 5/2010 | McLemore et al. | D7/332 |
| 7,713,241 B2 * | 5/2010 | Cartledge et al. | 604/151 |
| 7,722,172 B2 * | 5/2010 | Silverbrook | 347/86 |

| Patent No. | Date | Name | Class |
|---|---|---|---|
| 7,747,154 B2 * | 6/2010 | Silverbrook | 396/57 |
| 7,750,971 B2 * | 7/2010 | Silverbrook | 348/374 |
| 7,760,235 B2 * | 7/2010 | Silverbrook et al. | 348/207.2 |
| 7,773,113 B2 * | 8/2010 | Silverbrook et al. | 348/207.2 |
| 7,789,501 B2 * | 9/2010 | Silverbrook | 347/86 |
| 7,792,256 B1 * | 9/2010 | Arledge et al. | 379/102.01 |
| 7,793,853 B2 * | 9/2010 | Silverbrook et al. | 235/494 |
| 7,796,166 B2 * | 9/2010 | Silverbrook | 348/231.6 |
| 7,802,734 B2 * | 9/2010 | Stanimirovic | 236/13 |
| 7,804,521 B2 * | 9/2010 | Silverbrook et al. | 348/207.2 |
| D624,781 S * | 10/2010 | Allen et al. | D7/332 |
| 7,808,610 B2 * | 10/2010 | Silverbrook | 355/18 |
| 7,821,538 B2 * | 10/2010 | Silverbrook et al. | 348/207.2 |
| 7,826,088 B2 * | 11/2010 | Silverbrook | 358/1.18 |
| 7,828,002 B2 * | 11/2010 | Boldsen | 135/16 |
| 7,837,115 B2 * | 11/2010 | Silverbrook et al. | 235/475 |
| 7,854,135 B2 * | 12/2010 | Stanimirovic | 62/176.6 |
| 7,856,924 B1 * | 12/2010 | Stihi | 99/419 |
| 2001/0020757 A1 * | 9/2001 | Fried et al. | 264/443 |
| 2001/0029628 A1 * | 10/2001 | Ferrand et al. | 5/600 |
| 2001/0031342 A1 * | 10/2001 | Engle et al. | 428/195 |
| 2001/0038408 A1 * | 11/2001 | Codos et al. | 347/102 |
| 2002/0005870 A1 * | 1/2002 | Codos et al. | 347/9 |
| 2002/0020304 A1 * | 2/2002 | Reynolds | 99/339 |
| 2002/0030712 A1 * | 3/2002 | Silverbrook | 347/19 |
| 2002/0030713 A1 * | 3/2002 | Silverbrook | 347/19 |
| 2002/0033854 A1 * | 3/2002 | Silverbrook | 347/17 |
| 2002/0044188 A1 * | 4/2002 | Codos | 347/106 |
| 2002/0071104 A1 * | 6/2002 | Silverbrook | 355/18 |
| 2002/0080335 A1 * | 6/2002 | Silverbrook | 355/18 |
| 2002/0121101 A1 * | 9/2002 | Jebaraj | 62/259.1 |
| 2003/0000396 A1 * | 1/2003 | Leonard | 99/482 |
| 2003/0004470 A1 * | 1/2003 | Hickerson et al. | 604/251 |
| 2003/0051292 A1 * | 3/2003 | Ferrand et al. | 5/600 |
| 2003/0068185 A1 * | 4/2003 | Silverbrook | 400/613 |
| 2003/0088983 A1 * | 5/2003 | Wang et al. | 29/897.2 |
| 2003/0096899 A1 * | 5/2003 | Pearce | 524/474 |
| 2003/0111769 A1 * | 6/2003 | Laphan et al. | 264/318 |
| 2003/0112419 A1 * | 6/2003 | Silverbrook | 355/18 |
| 2003/0117496 A1 * | 6/2003 | Silverbrook | 348/207.2 |
| 2003/0146346 A1 * | 8/2003 | Chapman Jr. | 244/123 |
| 2003/0168156 A1 * | 9/2003 | Engle et al. | 156/230 |
| 2003/0170429 A1 * | 9/2003 | Engle et al. | 428/195.1 |
| 2003/0173460 A1 * | 9/2003 | Chapman, Jr. | 244/123 |
| 2003/0198406 A1 * | 10/2003 | Bibbo et al. | 383/41 |
| 2003/0225396 A1 * | 12/2003 | Cartledge et al. | 604/890.1 |
| 2003/0226857 A1 * | 12/2003 | Bibbo et al. | 222/148 |
| 2003/0231546 A1 * | 12/2003 | Bibbo et al. | 366/276 |
| 2004/0004129 A1 * | 1/2004 | Silverbrook | 235/487 |
| 2004/0004651 A1 * | 1/2004 | Silverbrook | 347/86 |
| 2004/0004698 A1 * | 1/2004 | Silverbrook et al. | 355/18 |
| 2004/0008261 A1 * | 1/2004 | Silverbrook | 348/207.2 |
| 2004/0008262 A1 * | 1/2004 | Silverbrook et al. | 348/207.2 |
| 2004/0008327 A1 * | 1/2004 | Silverbrook | 355/18 |
| 2004/0027912 A1 * | 2/2004 | Bibbo et al. | 366/149 |
| 2004/0030371 A1 * | 2/2004 | Barghelame | 607/96 |
| 2004/0041018 A1 * | 3/2004 | Silverbrook et al. | 235/375 |
| 2004/0051753 A1 * | 3/2004 | Silverbrook | 347/19 |
| 2004/0056105 A1 * | 3/2004 | Silverbrook | 235/494 |
| 2004/0059295 A1 * | 3/2004 | Cartledge et al. | 604/151 |
| 2004/0061734 A1 * | 4/2004 | Silverbrook | 347/19 |
| 2004/0065738 A1 * | 4/2004 | Silverbrook et al. | 235/494 |
| 2004/0069149 A1 * | 4/2004 | Wakefield | 99/330 |
| 2004/0071587 A1 * | 4/2004 | McAtarian | 422/1 |
| 2004/0075747 A1 * | 4/2004 | Silverbrook | 348/207.99 |
| 2004/0075821 A1 * | 4/2004 | Silverbrook | 355/18 |
| 2004/0080620 A1 * | 4/2004 | Silverbrook | 348/207.2 |
| 2004/0090553 A1 * | 5/2004 | Silverbrook | 348/375 |
| 2004/0119827 A1 * | 6/2004 | Silverbrook et al. | 348/207.2 |
| 2004/0125209 A1 * | 7/2004 | Silverbrook et al. | 348/207.2 |
| 2004/0125212 A1 * | 7/2004 | Silverbrook et al. | 348/207.99 |
| 2004/0128888 A1 * | 7/2004 | Payan et al. | 40/610 |
| 2004/0129789 A1 * | 7/2004 | Silverbrook | 235/494 |
| 2004/0139546 A1 * | 7/2004 | Ferrand et al. | 5/425 |
| 2004/0141061 A1 * | 7/2004 | Silverbrook | 348/207.2 |
| 2004/0155506 A1 * | 8/2004 | Gentry | 297/380 |
| 2004/0165060 A1 * | 8/2004 | McNelley et al. | 348/14.08 |
| 2004/0173201 A1 * | 9/2004 | Haemerle | 126/299 C |
| 2004/0179072 A1 * | 9/2004 | Silverbrook | 347/86 |
| 2004/0183914 A1 * | 9/2004 | Silverbrook | 348/207.2 |
| 2004/0196513 A1 * | 10/2004 | Silverbrook | 358/505 |
| 2004/0212652 A1 * | 10/2004 | Silverbrook | 347/19 |
| 2004/0213482 A1 * | 10/2004 | Silverbrook | 382/312 |
| 2004/0213613 A1 * | 10/2004 | Silverbrook | 400/62 |
| 2004/0218048 A1 * | 11/2004 | Silverbrook | 348/207.2 |
| 2004/0218049 A1 * | 11/2004 | Silverbrook | 348/207.2 |
| 2004/0218934 A1 * | 11/2004 | Silverbrook | 399/12 |
| 2004/0226098 A1 * | 11/2004 | Pearce | 5/655.5 |
| 2004/0226099 A1 * | 11/2004 | Pearce | 5/655.5 |
| 2004/0229986 A1 * | 11/2004 | Pearce | 524/380 |
| 2004/0246503 A1 * | 12/2004 | Silverbrook | 358/1.1 |
| 2005/0002736 A1 * | 1/2005 | Strassman | 404/95 |
| 2005/0006488 A1 * | 1/2005 | Stanimirovic | 236/49.1 |
| 2005/0017396 A1 * | 1/2005 | Pearce et al. | 264/148 |
| 2005/0022465 A1 * | 2/2005 | Warren et al. | 52/653.2 |
| 2005/0073908 A1 * | 4/2005 | Bibbo et al. | 366/314 |
| 2005/0092849 A1 * | 5/2005 | Silverbrook | 235/494 |
| 2005/0093909 A1 * | 5/2005 | Silverbrook | 347/19 |
| 2005/0094166 A1 * | 5/2005 | Silverbrook | 358/1.8 |
| 2005/0099445 A1 * | 5/2005 | Silverbrook | 347/19 |
| 2005/0103321 A1 * | 5/2005 | Wishart | 126/25 R |
| 2005/0115556 A1 * | 6/2005 | Carson et al. | 126/25 R |
| 2005/0122399 A1 * | 6/2005 | Silverbrook et al. | 348/207.2 |
| 2005/0127181 A1 * | 6/2005 | Silverbrook | 235/454 |
| 2005/0139363 A1 * | 6/2005 | Thomas | 169/30 |
| 2005/0145701 A1 * | 7/2005 | Silverbrook et al. | 235/473 |
| 2005/0146583 A1 * | 7/2005 | Silverbrook | 347/87 |
| 2005/0146613 A1 * | 7/2005 | Silverbrook et al. | 348/207.2 |
| 2005/0146614 A1 * | 7/2005 | Silverbrook | 348/207.2 |
| 2005/0151777 A1 * | 7/2005 | Silverbrook | 347/19 |
| 2005/0151819 A1 * | 7/2005 | Silverbrook | 347/104 |
| 2005/0158043 A1 * | 7/2005 | Silverbrook | 396/18 |
| 2005/0162455 A1 * | 7/2005 | Silverbrook | 347/19 |
| 2005/0162456 A1 * | 7/2005 | Silverbrook | 347/19 |
| 2005/0174412 A1 * | 8/2005 | Codos et al. | 347/102 |
| 2005/0178420 A1 * | 8/2005 | Reis | 135/133 |
| 2005/0179781 A1 * | 8/2005 | Silverbrook | 348/207.99 |
| 2005/0185198 A1 * | 8/2005 | Silverbrook | 358/1.1 |
| 2005/0185461 A1 * | 8/2005 | Silverbrook et al. | 365/185.03 |
| 2005/0192727 A1 * | 9/2005 | Shostak et al. | 701/37 |
| 2005/0209663 A1 * | 9/2005 | Hamilton et al. | 607/108 |
| 2005/0218236 A1 * | 10/2005 | Silverbrook et al. | 235/494 |
| 2005/0238341 A1 * | 10/2005 | Thaler et al. | 392/441 |
| 2005/0247793 A1 * | 11/2005 | Silverbrook et al. | 235/487 |
| 2005/0258248 A1 * | 11/2005 | Silverbrook et al. | 235/454 |
| 2005/0258259 A1 * | 11/2005 | Stanimirovic | 236/49.1 |
| 2005/0275815 A1 * | 12/2005 | Silverbrook | 355/18 |
| 2006/0007261 A1 * | 1/2006 | Silverbrook | 347/19 |
| 2006/0012652 A1 * | 1/2006 | Silverbrook | 347/86 |
| 2006/0025897 A1 * | 2/2006 | Shostak et al. | 701/1 |
| 2006/0028516 A1 * | 2/2006 | Silverbrook | 347/86 |
| 2006/0030745 A1 * | 2/2006 | Roselle et al. | 585/445 |
| 2006/0033674 A1 * | 2/2006 | Essig et al. | 343/912 |
| 2006/0041448 A1 * | 2/2006 | Patterson et al. | 705/1 |
| 2006/0048459 A1 * | 3/2006 | Moore | 52/79.1 |
| 2006/0050286 A1 * | 3/2006 | Silverbrook et al. | 358/1.1 |
| 2006/0055782 A1 * | 3/2006 | Silverbrook et al. | 348/207.2 |
| 2006/0056728 A1 * | 3/2006 | Silverbrook et al. | 382/276 |
| 2006/0072030 A1 * | 4/2006 | Silverbrook | 348/345 |
| 2006/0076423 A1 * | 4/2006 | Silverbrook et al. | 235/494 |
| 2006/0077248 A1 * | 4/2006 | Silverbrook | 347/108 |
| 2006/0104860 A1 * | 5/2006 | McAtarian | 422/28 |
| 2006/0146101 A1 * | 7/2006 | Silverbrook | 347/85 |
| 2006/0158519 A1 * | 7/2006 | Silverbrook | 348/207.2 |
| 2006/0169729 A1 * | 8/2006 | Reis | 224/154 |
| 2006/0180371 A1 * | 8/2006 | Breed et al. | 180/197 |
| 2006/0181607 A1 * | 8/2006 | McNelley et al. | 348/14.08 |
| 2006/0196501 A1 * | 9/2006 | Bibbo et al. | 128/200.23 |
| 2006/0212193 A1 * | 9/2006 | Breed | 701/29 |
| 2006/0212194 A1 * | 9/2006 | Breed | 701/29 |
| 2006/0214012 A1 * | 9/2006 | Silverbrook et al. | 235/494 |
| 2006/0225205 A1 * | 10/2006 | Troutman | 5/93.1 |
| 2006/0231627 A1 * | 10/2006 | Silverbrook et al. | 235/454 |
| 2006/0253988 A1 * | 11/2006 | Pearce | 5/655.5 |
| 2006/0256944 A1 * | 11/2006 | Silverbrook | 379/201.06 |
| 2006/0274114 A1 * | 12/2006 | Silverbrook et al. | 347/43 |
| 2006/0284839 A1 * | 12/2006 | Breed et al. | 345/156 |
| 2007/0011023 A1 * | 1/2007 | Silverbrook | 705/1 |

| | | | | |
|---|---|---|---|---|
| 2007/0027283 A1* | 2/2007 | Swift et al. .................... 527/312 |
| 2007/0035566 A1* | 2/2007 | Silverbrook .................... 347/2 |
| 2007/0040856 A1* | 2/2007 | Silverbrook .................... 347/5 |
| 2007/0046955 A1* | 3/2007 | Silverbrook .................... 358/1.1 |
| 2007/0087110 A1* | 4/2007 | Pilla .............................. 426/637 |
| 2007/0112400 A1* | 5/2007 | Hamilton et al. ............. 607/104 |
| 2007/0123679 A1* | 5/2007 | Swift et al. .................... 527/312 |
| 2007/0123680 A1* | 5/2007 | Swift et al. .................... 527/312 |
| 2007/0142596 A1* | 6/2007 | Swift et al. .................... 527/312 |
| 2007/0193576 A1* | 8/2007 | Hughes ......................... 126/513 |
| 2007/0200890 A1* | 8/2007 | Silverbrook .................... 347/19 |
| 2007/0201845 A1* | 8/2007 | Silverbrook et al. ........... 396/30 |
| 2007/0201846 A1* | 8/2007 | Silverbrook et al. ........... 396/30 |
| 2007/0259598 A1* | 11/2007 | Ribi .............................. 446/385 |
| 2007/0283992 A1* | 12/2007 | Hennessy ...................... 135/93 |
| 2007/0289548 A1* | 12/2007 | Smoot .......................... 119/668 |
| 2008/0015507 A1* | 1/2008 | Cartledge et al. ............. 604/151 |
| 2008/0022874 A1* | 1/2008 | Silverbrook .................... 101/330 |
| 2008/0024642 A1* | 1/2008 | Silverbrook et al. .... 348/333.01 |
| 2008/0062232 A1* | 3/2008 | Silverbrook .................... 347/86 |
| 2008/0062625 A1* | 3/2008 | Batio ............................ 361/680 |
| 2008/0085107 A1* | 4/2008 | Silverbrook .................... 396/40 |
| 2008/0086240 A1* | 4/2008 | Breed ............................ 701/1 |
| 2008/0087736 A1* | 4/2008 | Silverbrook .................... 235/494 |
| 2008/0128413 A1* | 6/2008 | Garcia .......................... 220/6 |
| 2008/0129475 A1* | 6/2008 | Breed et al. .................... 340/438 |
| 2008/0130272 A1* | 6/2008 | Waters .......................... 362/106 |
| 2008/0156887 A1* | 7/2008 | Stanimirovic ............... 236/12.1 |
| 2008/0160901 A1* | 7/2008 | Stanimirovic ............... 454/239 |
| 2008/0161975 A1* | 7/2008 | Stanimirovic ............... 700/276 |
| 2008/0161976 A1* | 7/2008 | Stanimirovic ............... 700/276 |
| 2008/0165253 A9* | 7/2008 | Silverbrook ............... 348/207.2 |
| 2008/0165254 A1* | 7/2008 | Silverbrook et al. ...... 348/207.2 |
| 2008/0176503 A1* | 7/2008 | Stanimirovic ............... 454/229 |
| 2008/0184980 A1* | 8/2008 | Czajkoski ...................... 126/30 |
| 2008/0229937 A1* | 9/2008 | Stephen et al. ............. 99/421 R |
| 2008/0246846 A1* | 10/2008 | Silverbrook et al. ...... 348/207.2 |
| 2008/0252732 A1* | 10/2008 | Silverbrook et al. ...... 348/207.2 |
| 2008/0252733 A1* | 10/2008 | Silverbrook et al. ...... 348/207.2 |
| 2008/0252734 A1* | 10/2008 | Silverbrook et al. ...... 348/207.2 |
| 2008/0252754 A1* | 10/2008 | Silverbrook et al. ........ 348/239 |
| 2008/0282652 A1* | 11/2008 | Wardlaw ....................... 55/385.2 |
| 2008/0312724 A1* | 12/2008 | Khan et al. .................... 607/115 |
| 2009/0032076 A1* | 2/2009 | Boldsen ........................ 135/16 |
| 2009/0039685 A1* | 2/2009 | Zernov ......................... 297/16.2 |
| 2009/0064415 A1* | 3/2009 | Payne et al. .................... 5/620 |
| 2009/0135215 A1* | 5/2009 | Silverbrook et al. ............. 347/2 |
| 2009/0135232 A1* | 5/2009 | Silverbrook et al. ........... 347/84 |
| 2009/0168345 A1* | 7/2009 | Martini ......................... 361/691 |
| 2009/0185014 A1* | 7/2009 | Silverbrook .................... 347/86 |
| 2009/0207255 A1* | 8/2009 | Silverbrook ............... 348/207.2 |
| 2009/0212593 A1* | 8/2009 | Larson .......................... 296/158 |
| 2009/0212598 A1* | 8/2009 | Otterstrom ................. 296/181.5 |
| 2009/0213150 A1* | 8/2009 | Silverbrook ...................... 347/3 |
| 2009/0227161 A1* | 9/2009 | Lambert ......................... 441/29 |
| 2009/0230012 A1* | 9/2009 | Choy et al. .................. 206/524.8 |
| 2009/0238811 A1* | 9/2009 | McDaniel et al. ........... 424/94.2 |
| 2009/0241784 A1* | 10/2009 | Colby .......................... 99/421 A |
| 2009/0242636 A1* | 10/2009 | Silverbrook .................. 235/454 |
| 2009/0244215 A1* | 10/2009 | Silverbrook et al. ........... 347/85 |
| 2009/0244292 A1* | 10/2009 | Silverbrook et al. ...... 348/207.2 |
| 2009/0251737 A1* | 10/2009 | Silverbrook .................. 358/296 |
| 2009/0257102 A1* | 10/2009 | Silverbrook .................. 358/498 |
| 2009/0262149 A1* | 10/2009 | Silverbrook ...................... 347/2 |
| 2009/0270545 A1* | 10/2009 | Sahnoune et al. ............ 524/476 |
| 2009/0278901 A1* | 11/2009 | Silverbrook .................... 347/86 |
| 2009/0295928 A1* | 12/2009 | Silverbrook ............... 348/207.2 |
| 2010/0001022 A1* | 1/2010 | McInerney .................... 222/175 |
| 2010/0079600 A1* | 4/2010 | Silverbrook ............... 348/207.2 |
| 2010/0091116 A1* | 4/2010 | Silverbrook et al. ...... 348/207.2 |
| 2010/0170951 A1* | 7/2010 | Silverbrook et al. .... 235/462.09 |
| 2010/0210745 A1* | 8/2010 | McDaniel et al. ............. 521/55 |
| 2010/0236763 A1* | 9/2010 | Torok ........................... 165/121 |
| 2010/0253791 A1* | 10/2010 | Silverbrook ............... 348/207.2 |
| 2010/0315516 A1* | 12/2010 | Silverbrook et al. ...... 348/207.2 |

FOREIGN PATENT DOCUMENTS

| | | | |
|---|---|---|---|
| FR | 2574168 A1 * | 6/1986 |
| FR | 2827146 A1 * | 1/2003 |
| JP | 58173320 A * | 10/1983 |
| JP | 61217631 A * | 9/1986 |
| JP | 01075822 A * | 3/1989 |
| JP | 01184333 A * | 7/1989 |
| JP | 03160233 A * | 7/1991 |
| JP | 04003826 A * | 1/1992 |
| JP | 09170782 A * | 6/1997 |
| JP | 09262182 A * | 10/1997 |
| JP | 09270230 A * | 10/1997 |
| JP | 10131391 A * | 5/1998 |
| JP | 10134707 A * | 5/1998 |
| JP | 10197002 A * | 7/1998 |
| JP | 10238806 A * | 9/1998 |
| JP | 10253148 A * | 9/1998 |
| JP | 2002025437 A * | 1/2002 |
| JP | 2004173780 A * | 6/2004 |
| JP | 2004227882 A * | 8/2004 |
| JP | 2006095322 A * | 4/2006 |
| JP | 2007040677 A * | 2/2007 |
| JP | 2007078296 A * | 3/2007 |
| JP | 2008144999 A * | 6/2008 |

OTHER PUBLICATIONS

Fox Hill Corp., "Double Oven", Website, Oct. 9, 2003, (www.foxhill.net).

* cited by examiner

COLLAPSIBLE HEATING APPARATUS

TECHNICAL FIELD OF THE INVENTION

The present invention is applicable to the field of portable cooking devices as may be used while backpacking, camping or during emergency situations.

BACKGROUND

In many circumstances it is desirable to have a compact or portable heating device for heating food, beverages or other items when a conventional oven or stove is unavailable. For example, a portable heating device may be useful to people who camp or backpack and need a convenient way to heat food items wherever they may find themselves. Similarly, it is common to find construction sites or remote work sites where no utilities are provided or no appliances are installed. In other situations, such as a natural disaster or a power outage, an existing cooking appliance may be inoperable. A portable heating device may be employed on such rare occasions and yet may be easily stored out of the way during the majority of the time when it is not needed.

To facilitate being used in these ways, it is desirable to provide a heating implement that is portable, lightweight and compactly stored. It is also desirable that the unit operate independently of any particular immobile supply of energy such as an electrical wall socket or a natural gas line.

A number of portable heating devices have been commercially available or proposed by others, offering various degrees of compactness and suitability for various types of use. These are typified by U.S. Pat. No. 4,508,096 to Slattery, U.S. Pat. No. 5,713,344 to Gilbert, U.S. Pat. No. 5,119,799 to Cowan and U.S. Pat. No. 1,411,596 to Tallman.

SUMMARY

As mentioned, many implements have been developed to provide a collapsible device for supporting food or other items over a source of heat. The devices of the prior art do not adequately accommodate the need to selectively provide an oven suitable for baking, a stove top suitable for heating items held in other containers, and an open grill surface suitable for heating items directly over a flame or heat source.

The present invention provides for a single compact unit that, in various configurations, may be used in all of these capacities. Aside from adaptability for use in a wide variety of configurations, further improvements are realized in the degree of compactness and lightweightness and in ease of manufacture and use.

In accordance with an exemplary embodiment of the present invention, a set of side panels are provided which may be affixed to one another along adjacent edges to form a frame structure that is initially open at top and bottom. A grill or other surface may be horizontally disposed within the frame assembly and be held by engaging the top edges of the side panels or by grooves or vents formed in the side panels.

In accordance with a preferred exemplary embodiment, the present invention provides for at least one side of the frame structure to comprise one or more side panels that may be configured in various ways to alter the position at which the grill sits within the frame and to alter which areas of the side are enclosed or left open.

In an exemplary embodiment, the present invention further provides for a bottom panel and a top panel. The bottom panel may support a heat source, such as combustible fuel, and the assembled frame may be set upon the bottom panel. The frame, once assembled, may be set upon the bottom panel to support food items at some distance over the heat source. The top panel may be placed atop the frame to shield the food and heat source from weather, to serve as an auxiliary heating surface and to provide enclosure when the device is used in an oven configuration.

In accordance with an exemplary embodiment, the top and bottom panels may be formed to slidably engage or otherwise fit together so as to form a container shell for storing other components of the cooking device as taught herein.

The present invention provides for a device facilitating the heating of items, the device comprising a collapsible frame for suspending an item above a heat source. The frame comprises a plurality of panels forming sides of the frame when the frame is erected, wherein a side of the frame is selectively configured to adjust including at least one of the following an attributes of the assembled enclosure: how much of the side is enclosed, which portion of the side is enclosed, a position at which a transverse member is supported by the frame, a volume substantially enclosed by the frame and an overall shape of the frame.

BRIEF DESCRIPTION OF THE DRAWINGS

Other features and advantages, as well as clarification on the making and using of the present invention, will be apparent from the detailed description provided below in conjunction with the accompanying figures wherein.

The following detailed description of the invention refers to the accompanying drawings. Within these drawings, the same reference numbers may be used in different drawings to identify the same or similar elements.

DETAILED DESCRIPTION OF EXEMPLARY EMBODIMENTS

While detailed descriptions of one or more exemplary embodiments are now explained, it should be understood that none of the particular characteristics, sizes, shapes, quantities, materials or other attributes mentioned by way of illustration are to be construed as limiting the invention to those specific attributes. Instead, the scope of the present invention afforded coverage is to be defined by the appended claims and applicable equivalents.

In preparing to use a heating/cooking unit according to the present teachings, a collapsible 'frame' is assembled or erected which functions to provide support of the items that are to be heated or cooked and to partially or fully enclose a heated space in various arrangements. This frame preferably comprises a number of side panel members which cooperatively engage one another to form the erect frame when needed. U.S. Pat. No. 6,591,828, issued to D. G. Schneider, is hereby incorporated by reference in its entirety as if fully set forth herein.

Although in the present description it will be convenient to describe how the side panels fit together using terms such as 'vertical', 'upright', 'above' or 'below', it should be understood that, in accordance with many possible embodiments, the frame may be assembled in free space. In other words, many embodiments are possible wherein one may assemble the frame as it is held in one's hands and without having to rest the elements on a surface or orient them in any particular way with respect to gravity. This is also true of later references to some elements as being 'horizontal' such as the grill or transverse support member. Of course, in some embodiments, having a solid flat surface to work upon may facilitate assembly to some extent. Some embodiments may be easier to assemble if the components are placed on a relatively flat surface such as the ground, a rock or a table top.

Figure 1:
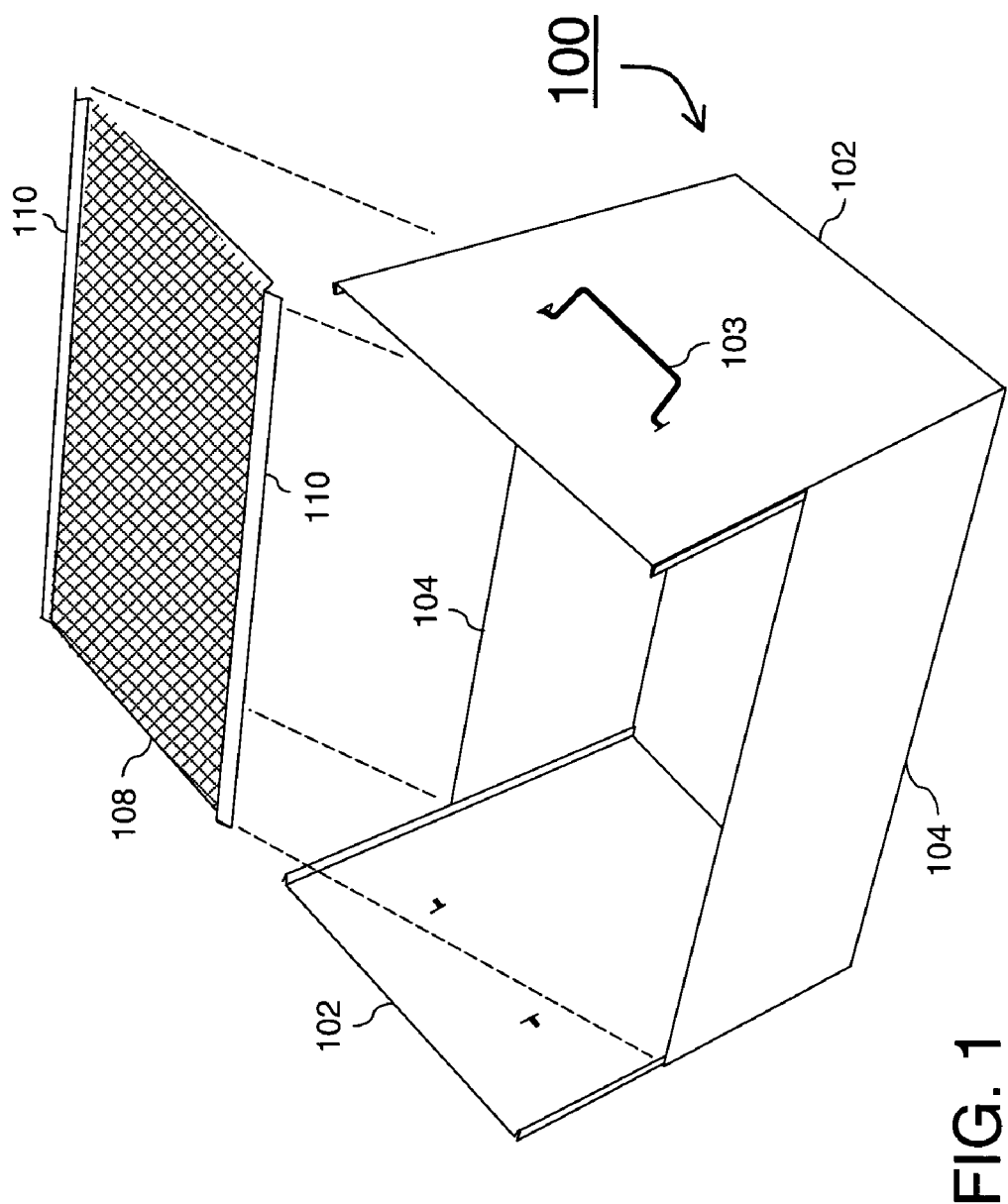
FIG. 1 is a pictorial view of frame enclosure in accordance with an exemplary embodiment of the present invention, wherein the unit is configured to be suitable for the baking of food items.

FIG. 1 depicts a rectangular partial enclosure or a 'frame' 100 as may be formed by various panel members in accordance with an exemplary embodiment. Two panels, arbitrarily referred to herein as 'end panels' 102, comprise handles 103 and are generally designed to allow the frame 100 to be lifted and moved during use. It should be noted that the present invention does not require the use or designation of some panels as 'end panels' as shown.

Handles 103 may be of various configurations and may be removable, retractable or foldable. For example, FIG. 1 depicts a handle 103 as being of wire or tubular structure whereas FIG. 3 will show handle 103 to be of a bent strip of material. As is well known, a panel having such handles may be formed to or cut to accept the handles. A panel having a handle may also be formed with a recessed area into which the handle nests wherein the handle occupies a low profile to facilitate compactly storing the unit. Handle 103 made of a formed strip as in FIG. 3 may fit into slots cut through end panel 102. While the ends of the strip may be bent outward so that the handle remains captive with the end panel. Nevertheless, the handle may be free to slide inward or outward through the slots and, when stowed, may protrude though the inward side of panel 102 as will be seen in FIG. 14A.

As shown in FIG. 1, side panels 104 engage end panels 102 along adjacent edges to form the rectangular enclosure and serve to support a grill 108. Rails 110 or similarly formed portions of grill 108 are designed to rest upon the upper edges of side panels 104. It is important to clarify that the term "side panel" applied to a particular piece should not be confused with the location that the piece finds itself in the assembled frame or assembled overall unit. A wide variety of arrangements are possible and the elements may be arranged in a variety of ways to form a variety of structures.

Figure 2:
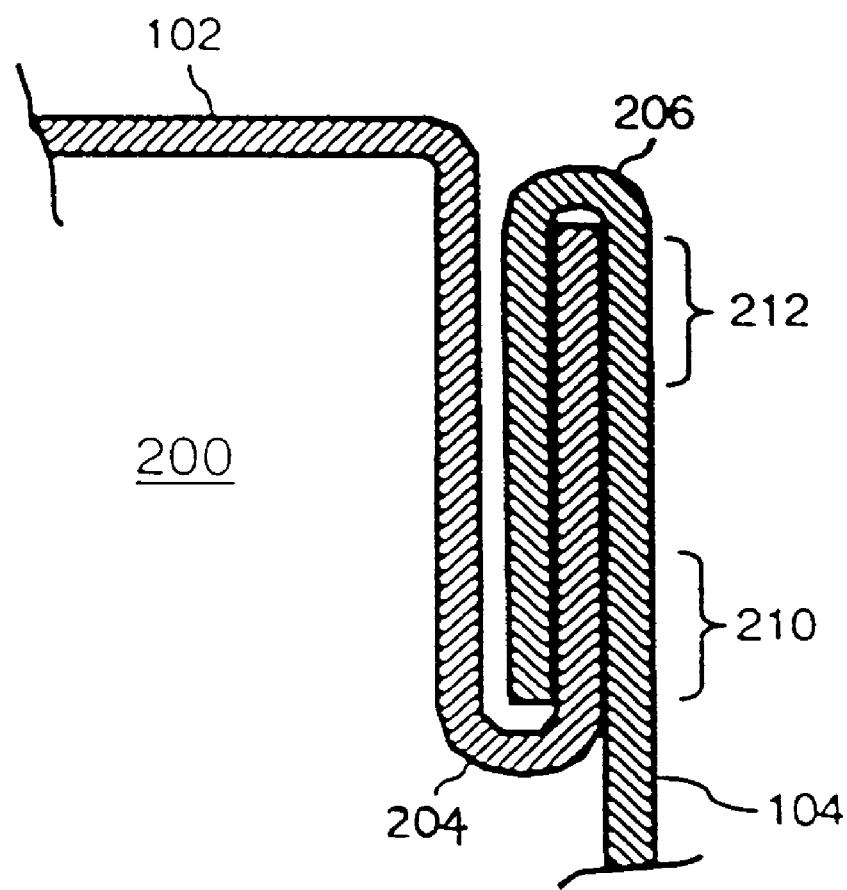
FIG. 2 is a cross-sectional view of a joint between adjacent panels in accordance with an exemplary embodiment of the present invention.

FIG. 2 is a cross-sectional view depicting one manner in which panels, such as end panel 102 and side panel 104 of FIG. 1, may be coupled to one another along a adjacent edges. The edge of end panel 102 is shown to have an L-shaped bend 202 and a U-shaped crimp 204 whereas the edge of side panel 104 has a U-shaped crimp 206. Although many variations are possible, this arrangement is considered to be advantageous in that there are no sharp edges exposed when assembled and the joint occupies very little space. This type of joint forms an adequate seal to contain or channel smoke and combustion gases and to keep rain and wind from entering the enclosure. This type of joint contributes a certain degree of rigidity to the frame assembled which, as mentioned before, may be desirable to facilitate assembly of the device. This joint arrangement also allows any outward forces exerted by the installing of the grill to contribute to holding the joint together.

The formation of the U-shaped crimps 204, 206 or the L-shaped bend 202 may contribute to the tightness and rigidity of the joint formed between panels 102 and 104. The crimp in panel 104 may be tight enough so as to apply a clamping force onto the crimped portion of panel 102 roughly in the vicinity of the proximal region 210. Alternatively, crimp 206 may be formed to be narrower at a distal region 212 than at proximal region 210 such that the crimped edge of panel 102 wedges into tight engagement as it is insert towards the distal region 212. Yet other alternatives relate to the formation of crimp 204 causing clamping forces to be applied to the mating end of panel 104 in the vicinity of distal region 212 and/or proximal region 210. Of course, panels 102 and 104 may mutually clamp one another to some extent, depending upon how they are crimped. The geometry of the L-shaped bend may also be controlled to introduce a slight tilt or binding effect that increases the holding force between the panels. The L-shaped bend shown does not have to be associated with the end panel 102. This aspect could just as easily be applied to the side panel 104 instead. Furthermore, each side panel may comprise a mixture of these types of bends to facilitate a wide variety of possible arrangements. The L-shaped bend need not be a right angle. In some implementations, this bend may be at some other angle to facilitate forming an enclosure that is, for example, hexagonal, octagonal or of some other shape.

The manner of forming a detachable joint between panels just described is one of many possible ways to couple the panels. Some or all of the panels employed in forming a collapsible frame may comprise hinges which are permanent or are detachable (such as a pintle and gudgeon arrangement). Some or all of the panels may be coupled together using notches, tabs, slots or dovetailing along the edges. Joints may also be formed by having a protrusion or long 'bead' formed on one panel which slides into a matching concave groove in another panel. This is particularly easy to form if the panels are formed by an extrusion process.

It is generally desirable to minimize the number of loose pieces or fasteners involved in assembling the frame. Consequently, a simple joint arrangement as shown in FIG. 2 is considered preferable to a design involving loose screws, springs, clips or pins. Even captive fasteners are discouraged due to manufacturing complexity, size and difficulty in cleaning.

Depending on how the side panels are designed, the frame assembly may be fairly rigid when it is completely assembled or become rigid at an intermediate stage of assembly. For example, if the side panels engage one another using joints that enforce a certain dihedral angle, such as a right angle, then even the first two side panels to be coupled together may provide some rigidity along at least one axis of rotation and perhaps one or more translational directions as well. Alternatively, one or more of the joints between panels may be quite free to move or swivel along an axis. As will be described, the insertion of a transverse member or grill may lend mechanical rigidity to the frame, so it is conceivable that some embodiments of the outer frame may remain quite flexible or collapsible until the final addition of the transverse member. It is thought to be preferable that the frame exhibit some degree of rigidity without relying entirely upon having the grill inserted therein. This is expected to make the unit easier to manipulate during assembly and perhaps safer to use.

Any number of the sides of the assembled frame 100 may be similarly constructed and of variable configuration involving one or more side panels. In accordance with a preferred exemplary embodiment, at least two opposing sides comprise side panels, such as end panels 102, spanning the overall height of frame 100 and being preferably equipped with some manner of handles by which to lift the frame when assembled. These two sides are used in conjunction with two other sides, which are formed from shorter side panels and exhibit the configurability described above, to form an overall rectangular box shaped enclosure. One advantage to employing full-height end panels is that, even when a minimum degree of enclosure is desired, the upright end panels provide some shielding against wind and against accidental knocking over of items set upon the grill.

The providing of handles along with a rigidly assembled frame means that the entire frame assembly may be lifted by exerting upward forces on fewer than all of the side panels, perhaps even while items remain on the grill. A design wherein the frame holds together in this manner facilitates use over other heat sources independently of a base or bottom cover, rearranging or replenishing fuel while cooking, moving the unit intact to a point of cleaning and disassembly, and assembling the frame or overall unit under adverse conditions.

Those of ordinary skill will recognize that there are many viable possibilities for coupling panels together to form a frame enclosure. It should also be apparent that, although it is thought to be preferable to join panels at adjacent edges, it is possible to design panels that may be conjoined at places other than the edges.

In some of these approaches, the panels may be engaged by sliding mating pieces together in line with the axis of the joint. Other approaches may enable insertion of one panel into a receiving feature of another panel from a radial direction without having to move the panels in line with the axis of the joint.

The extent to which coupled panels tend to stay secured and, in particular, the extent to which side panels supporting the grill tend to stay at the desired position, may be controlled by friction or tightness of fit at the joints between panels, by the use of dimples, detents, notches or compliant members associated with the joints or by the use of sticky or roughened surfaces to enhance friction where mating surfaces meet. The tightness or security of the connections among panels is important for keeping the frame and grill intact, even if the assembly is lifted by the handles while food items are on the grill. This is likely to occur if, for example, a user desires to rearrange fuel, such as charcoals, while the unit is being used for cooking.

The manner in which the side panels become attached to one another may vary within the frame. For example, some joints may result in a hinged attachment whereas others may be rigid. In the case of a rectangular enclosure, having one or two joints enforce a right angle will inherently maintain a right angle among the remaining hinged joints. One advantage to using a simple joint arrangement as depicted in FIG. 2 is that the panels may be joined in a variety of ways to form various structures, including improvised structures, and the separate panels may be used for alternative purposes. In an emergency situation, the panels may be used for a variety of other purposes, such as to form a makeshift cooking surface, or perhaps other purposes unrelated to cooking or heating.

As will be described below, a variety of side panels 104 may be supplied having different dimensions, such as a dimension in the vertical direction when installed as part of the frame. By selection of side panels having a given dimension, or a combination of side panels stacked upon one another, grill 108 may be supported at a variety of positions within frame 100. Furthermore, sections of the sides of the frame may selectively be enclosed or left open depending on the variable arrangement of side panels installed. A principal advantage of the present teaching is that various arrangements of the grill within the frame are possible, as will now be described. Some of the many possible configurations are now described in conjunction with FIGS. 3-5.

Figure 3:
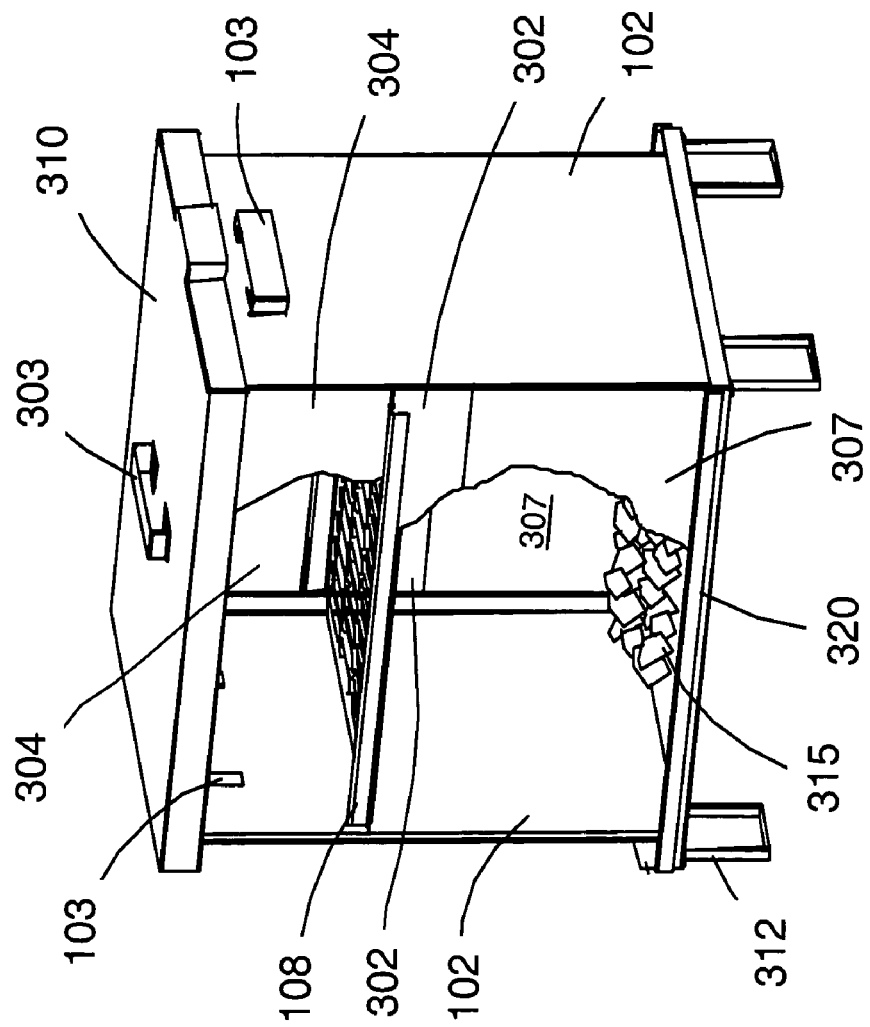
FIG. 3 is a pictorial view of an assembled unit in accordance with an exemplary embodiment of the present invention, wherein the unit is configured to be suitable for baking items.

In FIG. 3, a pair of side panels, side panel 302 and side panel 307, have been 'stacked' in an arrangement along one side (which may be regarded as the 'front' side of the unit for the present discussion) to cause the transverse support member or grill 108 to be supported at a particular elevation above a heat source 315. In addition, side panel 304 is shown to be engaged as part of the same side of frame assembly 100 as side panels 302 and 307, yet positioned above the transverse support (grill) so as to form an enclosure above the level of the grill. As shown, this pattern may also be repeated along the 'back' side as well, such that a complete enclosure or oven is formed being suitable for baking of items therein.

In accordance with an exemplary embodiment, side panel 302 measures 2" in height when installed as part of the assembled frame. This panel may be used to prop the grill by at least 2 inches from the bottom plane of the frame assembly and/or may be used to wall a 2" tall portion of a side of the frame enclosure. Likewise, side panels 304 and 307 measure 4 inches and 7 inches in height, respectively. Thus, in the configuration depicted in FIG. 3, grill 108 may be supported by the combination of panels 302 and 307, resulting in the grill be held a total of 9" above the bottom cover 320 on which the frame rests. Having a combination of sizes enables a wide range of grill height settings and enclosure. Other combinations of panel dimensions are possible.

In FIG. 3, frame 100 is shown being used along with optional top cover 310 and bottom cover 320. As will be described, bottom cover 320 may serve as a stand to support the frame and heat source. Top cover 310 may comprise a handle 303 by which to lift the top cover 310. In some configuration, handle 303 may also serve as a tote handle for the overall unit when it is collapsed and stored as will be described in conjunction with FIG. 13 later.

Figure 4:
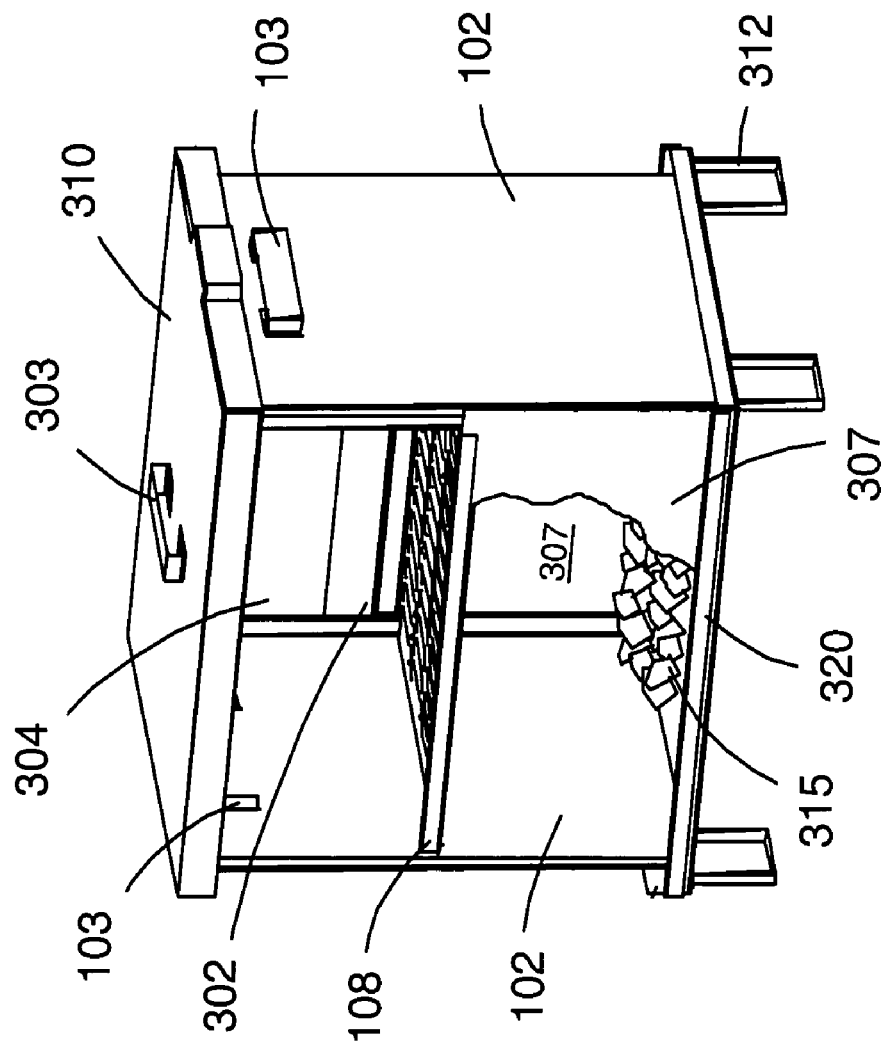
FIG. 4 is a pictorial view of an assembled unit in accordance with an exemplary embodiment of the present invention, wherein the unit is configured to be suitable for grilling items.

In FIG. 4, a slightly different arrangement is shown wherein side panel 307 alone is used to form the 'front' side and to support the grill at a somewhat lower height than in the arrangement of FIG. 3. The portion of the 'front' side above the grill is shown to be left open for manipulating items placed on the grill. In further contrast to FIG. 3, side panels 302 and 304 have been re-deployed along the 'back' side of the unit to provide enclosure above the level of the grill.

Figure 5:
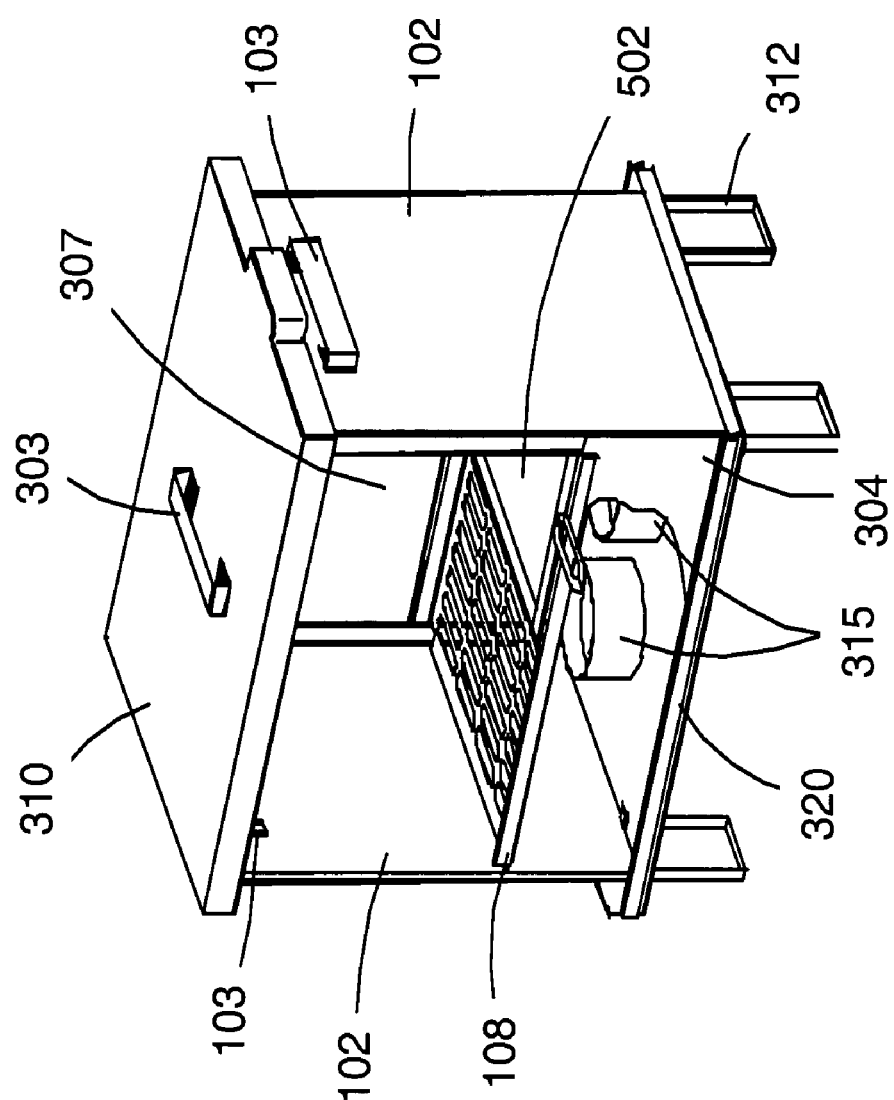
FIG. 5 is a pictorial view of an assembled unit in accordance with an exemplary embodiment of the present invention, wherein the unit is configured to serve as a stove for heating items.

In yet another arrangement, shown in FIG. 5, panel 304 is used along the 'front' side to support the grill even closer to the heat source and providing more room to manipulate food items underneath top cover 310. Of course, top cover 310 may optionally be set in place as shown or may be removed to make items resting on the grill accessible from above. Top cover 310 may be momentarily lifted off of the frame enclosure to permit checking on items, repositioning, or for stirring or adding of contents in a utensil, such as a pot or kettle resting on the grill.

Although a rectangular enclosure is shown in FIGS. 3-5 by way of example, the enclosure may comprise any number of sides. In accordance with the present teachings, any one side or combination of sides of such a frame or enclosure may be of variable arrangement, similar to what is shown as the front side of the enclosure of FIGS. 3-5, to allow changing the height at which grill 108 (or other support member) is supported or to allow different portions of the side to be selectively enclosed or left open as desired. It is also contemplated that the proper design of joints may enable forming frame or enclosure structures that are stackable, have variable numbers of sides or otherwise support many configurations, such as supporting multiple grills at various heights or creating multiple enclosed spaces.

Figure 6:
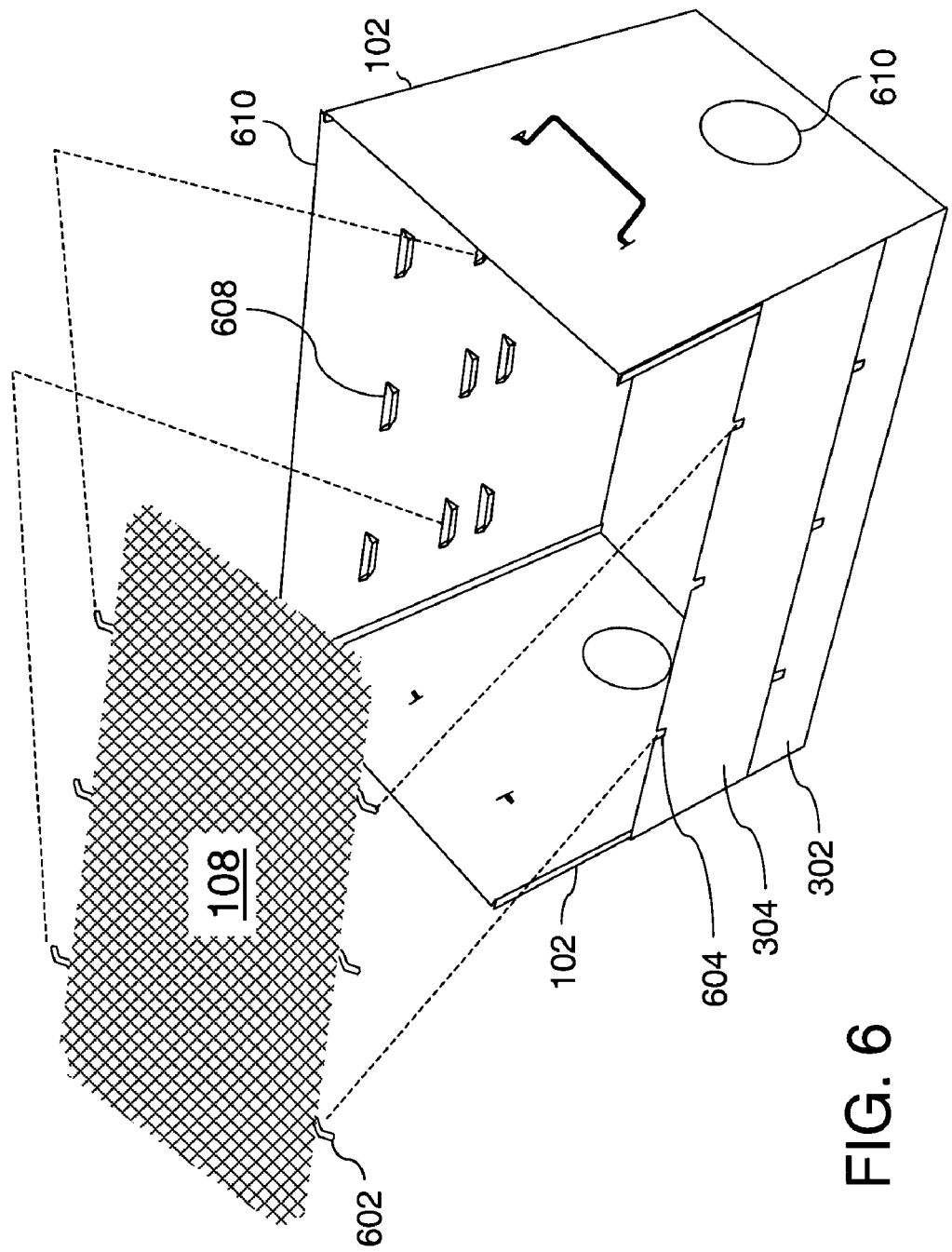
FIG. 6 is a pictorial view of a frame assembly comprising panels having notches and louvers to support a grill at a desired height.

In an alternative embodiment shown in FIG. 6, a single side of the frame may be formed of rearrangeable panels as described above, while other sides, such as the sides adjacent to, or the side opposite to, the reconfigurable side, comprises slots, vents, notches or other features which may support the transverse support surface at a variety of heights. For example, a 'back' side panel 610 may be formed with louvers, indentations or vents 608 at intervals to provide ventilation and to support the transverse support surface at whatever height is dictated by the adjustable opposite side.

Accordingly, in FIG. 6, an alternative design for grill 108 is shown to comprise protrusions 602 which may rest upon the side panels or set into vents 608 in the side panels. If the grill is of wire frame construction, for example, then these protrusions may be readily formed at the ends of some rods or wires in the construction of the grill.

Figure 7A:
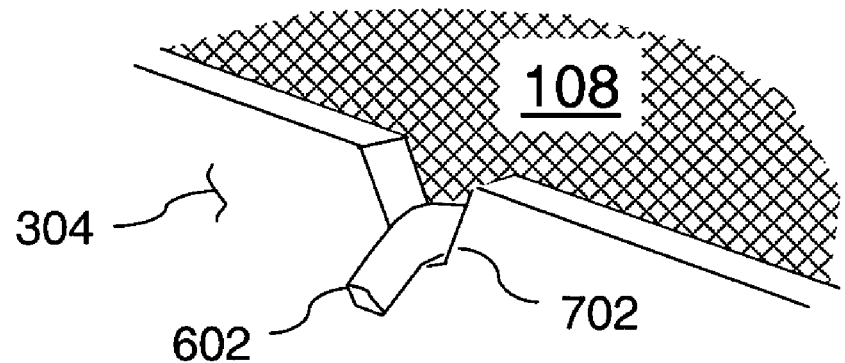
FIGS. 7A-7B are pictorial views depicting the manner in which protrusions from a grill may fit into notches and vents formed in side panel members in accordance with an exemplary embodiment of the present invention.
Figure 7B:
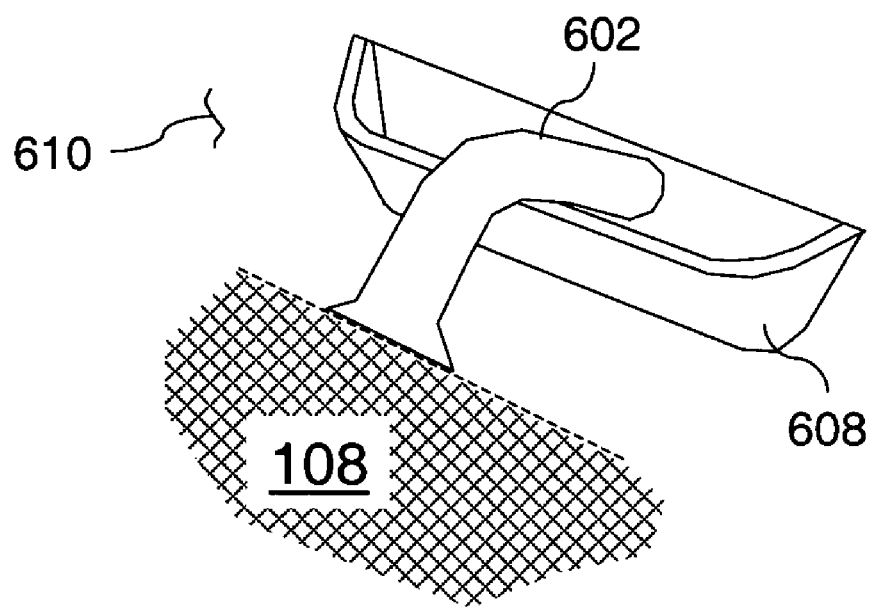

For securing of the grill within the frame and improving rigidity of the assembled unit, a protrusion 602 from grill 108 may seat into a notch 604 in a side panel as depicted in FIG. 7A. As depicted in FIG. 7A, a protrusion from the grill may also slip into a vent hole or similar feature formed in a side panel, such as the backmost panel 610 shown in FIG. 6. Note that proper dimensioning of the protrusion and the vent formed in the side panel may provide some degree of locking wherein the grill cannot be removed straight upwards but must instead be tilted into place. This may reduce the chances of inadvertently knocking the grill loose as the unit is used or cleaned or of accidentally lifting the grill out of place when there are sticky substances on the grill.

Beyond what is shown in FIG. 6, holes, ridges, notches or vents may be also be provided in end panels 102 to receive protrusions on grill 108. FIG. 6 also incidentally depicts optional holes 610 in end panels 102 providing for ventilation, for observing fuel and for manipulating fuels or adding combustible fuels such as paper, sticks or narrow pieces of wood. Where a gas burner manifold is used as a heat source inside the enclosure, holes 610 may also be used for inserting the manifold or for passage of the tubing between the manifold and a gas supply tank. Where an electric heating element is used as the heat source, holes 610 may be used for insertion of the heating element or passage of the electrical supply cord.

As was shown in FIGS. 3-5, an overall cooking and heating apparatus of the present teachings may further comprise a top cover 310 which is useful for placing atop the assembled frame 100. Top cover 310 may cooperate with other elements to form a completely enclosed compartment suitable for baking as shown in FIG. 1 or may optionally be used in stove and grilling configurations to shelter the heat source, cooking surface and food items from wind or precipitation.

Top cover 100, when placed as shown in FIG. 1, may also become heated during the use of the unit and may be used as an auxiliary warming surface. Materials to be mildly heated, such as bread enclosed in metal foil, may be placed on top of the top panel as the unit is being used to heat or cook other items.

A thermometer (not shown) may optionally be included in top cover 310 to display approximate temperature inside the enclosed space formed when the unit is used as in FIG. 1.

An optional bottom cover 320 may be large enough to completely cover the bottom opening of the assembled frame 100 and may serve as a surface upon which a heat source such as burning charcoals or alcohol-containing pots may be placed or supported. As shown in FIGS. 3-5, bottom cover 320 may comprise integral or removable legs 312 or other form of stand-off to support the bottom cover and, in fact, the entire assembled cooking apparatus at a distance away from a supporting surface upon which the unit is placed while in use. The spacing of the bottom panel a distance away from the supporting surface reduces heat transfer that may otherwise damage the supporting surface under the unit as the bottom panel is heated by the heat source. This measure protects picnic tables, floors, painted surfaces or combustible ground cover from being damaged underneath where the unit is placed.

The legs 312 or other standoff elements that hold the unit away from a supporting surface may be made of a material that has heat insulating properties and may additionally or alternatively be of slender construction as to minimize cross-sectional area available for conducting heat. The legs or other standoff elements may be of a variety of designs and are thought to be best made captive with the bottom panel and collapsible or retractable in some fashion. Of course, removable legs, stand-offs or props to support the unit may be provided as well.

Figure 11:
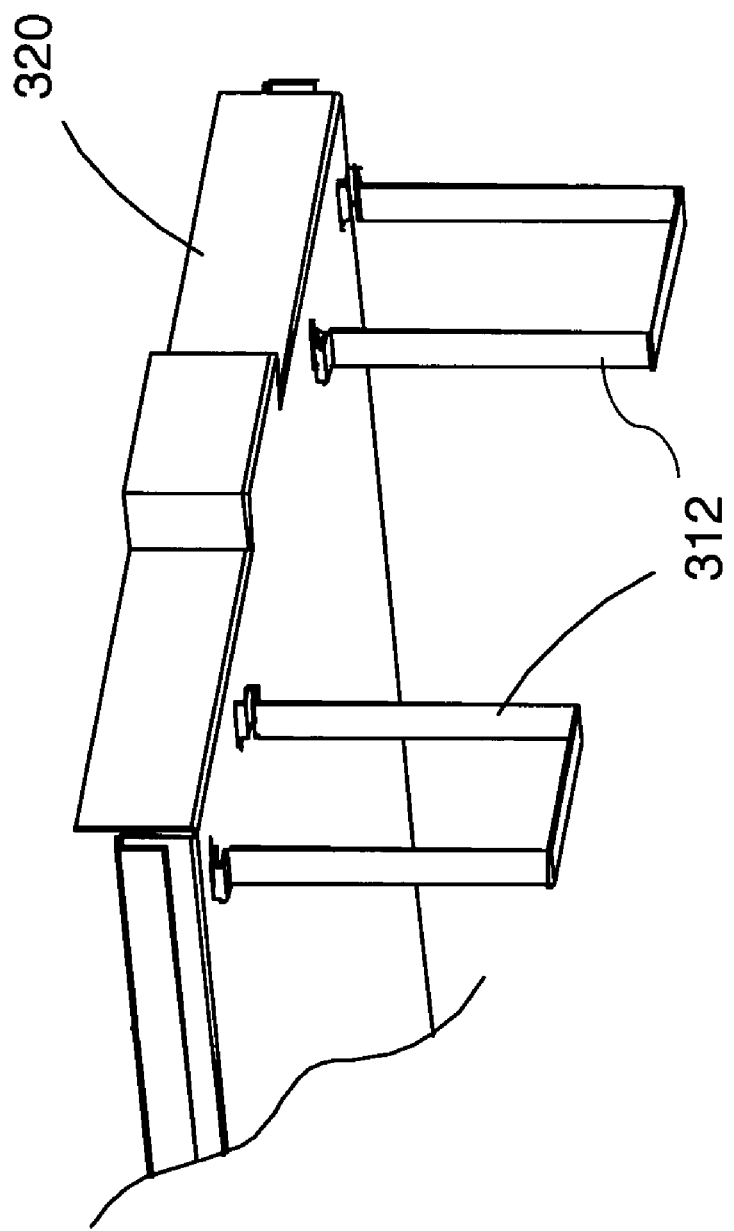
FIG. 11 illustrates a form of standing leg that may be applied to a bottom cover to support the heating unit a distance way from a supporting surface.

In accordance with one embodiment shown in FIG. 11, legs 312 are formed of thin strips of material and bent into a squared-off 'U' shape as shown. These removable legs may fit into slots provided in the bottom cover and may be stowed inside the unit when not in use.

Figure 12:
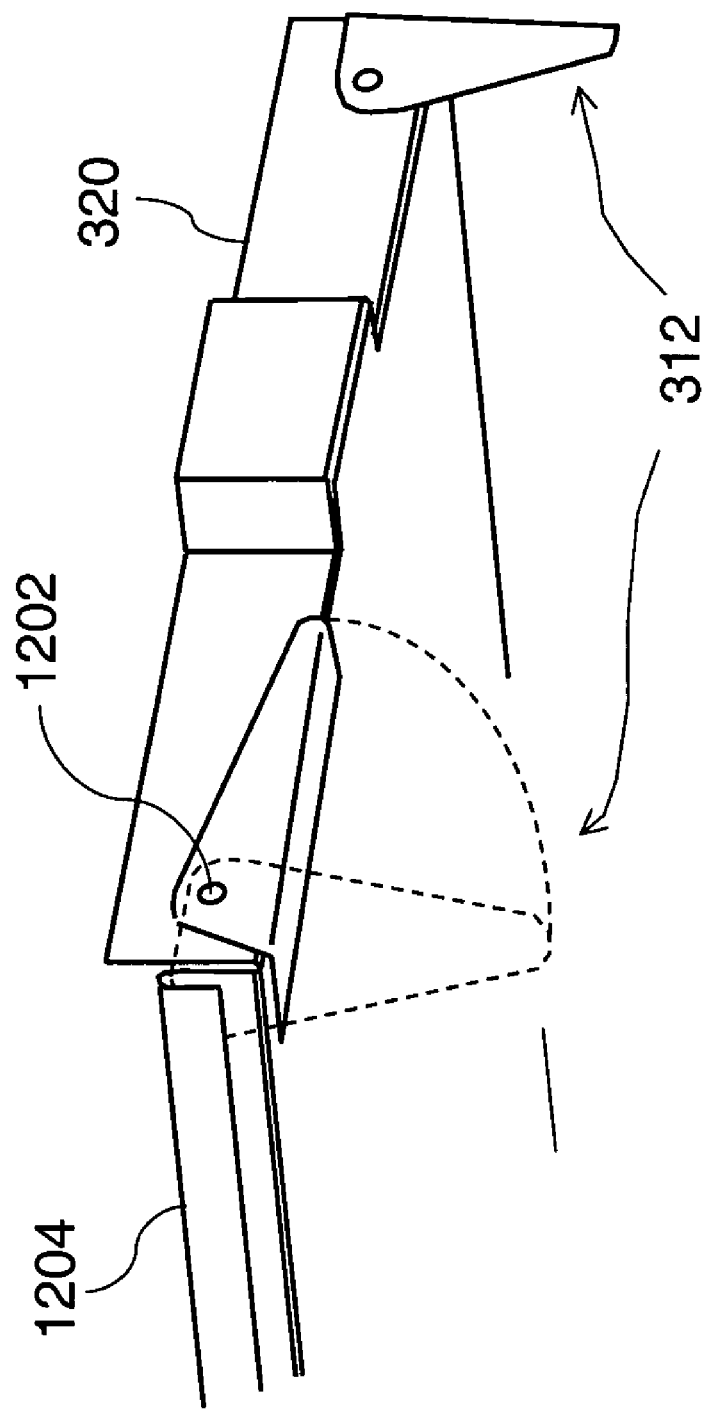
FIG. 12 illustrates an alternative form of pivoting standing leg that may be applied to a bottom cover to support the heating unit a distance way from a supporting surface.

In accordance with an alternative embodiment shown in FIG. 12, legs 312 may remain attached to bottom cover, via pivots 1202, and may swivel down into place when needed. When not needed, these legs may swivel upward and be stowed along the outer edges of the bottom cover. The securing of the legs in the stowed or deployed position may be assisted by the presence of dimples (not shown) formed in the legs and the bottom cover. When deployed, the legs may be stopped and supported by a rail or bent edge formed in the bottom cover as shown.

Figure 13:
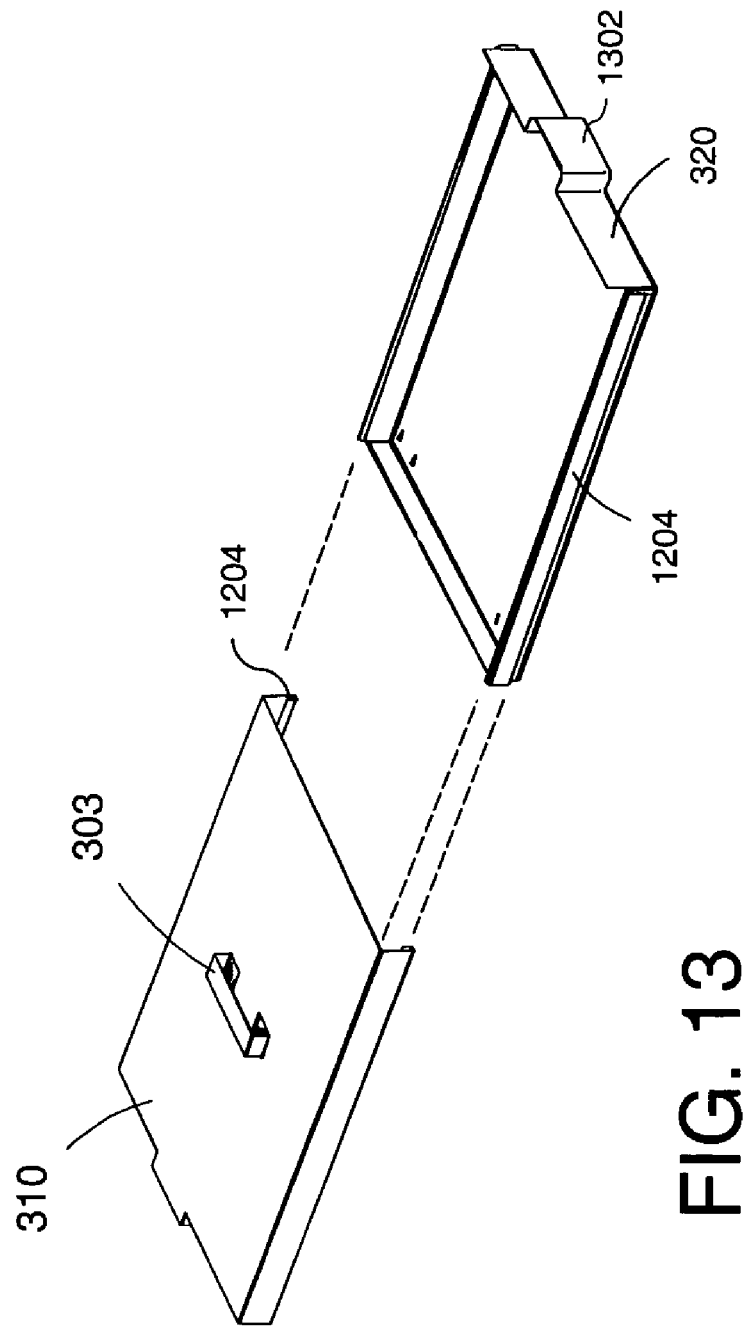
FIG. 13 depicts a manner in which the top cover may slidably engage the bottom cover and form an enclosure suitable for holding components of the unit in accordance with an exemplary embodiment of the present invention.

In accordance with preferred embodiments, the top and bottom covers cooperatively form a flattened enclosure suitable for containing some or all of the components of the unit when it is not in use. When disassembled, collapsed or folded, panels 102, 302, 304, 307 that make up the frame assembly may be held within this flattened enclosure, resulting in a conveniently packaged compact unit. As shown in FIG. 13 top and bottom covers 310, 320 are preferably provided with complementary folded edges or rails 1204 so that the pieces may slide together to form an enclosure or container. This container may be opened using handles or finger pulls 1302 to facilitate sliding the top cover off of the bottom cover.

Figure 14A:
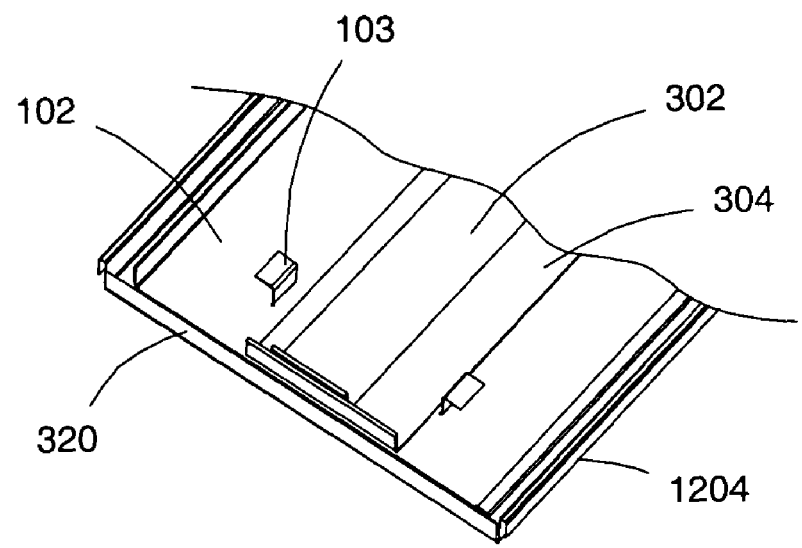
FIGS. 14A-14B depict a manner of storing various components of a collapsible heating unit within the bottom cover of the unit in preparation for enclosing the contents between the top and bottom covers.
Figure 14B:
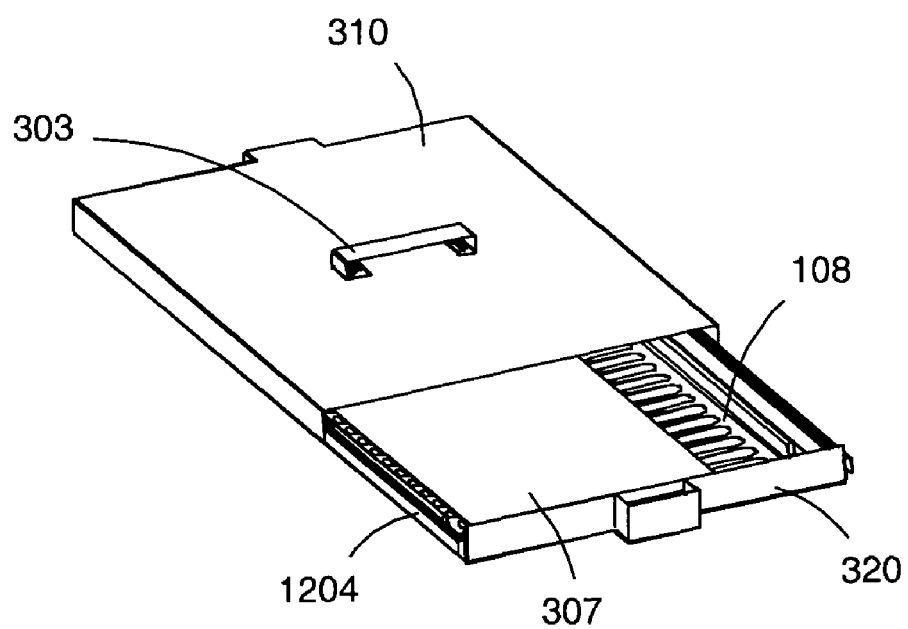

In the pictorial views of FIGS. 14A and B, it is evident that the container formed by covers 310, 320 may accommodate a stack of panels 102, 302-307 and preferably the grill 108 and any other compact cooking implements as part of the unit. Depending on implementation, these components may need to be oriented in a specific way to fit within the container or to prevent the components from rattling around excessively within the container. For example, FIG. 14A shows the portions of a retractable handle 103 protruding from a panel 102 and the ability to fit side panels 302, 304 in the space between the protrusions. This means that the handle 103 must be wide enough to accommodate panel 304. In general for the purposes of designing such as unit, it may be observed that there are possible relationships among the dimensions of various components to optimize both the assembled and stowed configurations of the unit.

With proper design, grills and utensils may be stowed along with side panels and end panels within the same container formed by the top and bottom covers 310, 320.

Figure 15:
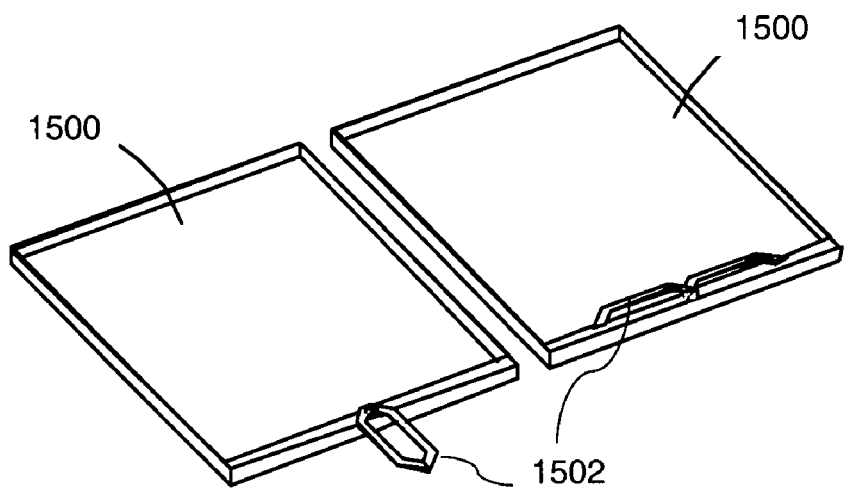
FIG. 15 depicts a utensil in the form of a pan or shallow tray and having a pivoting handle as may optionally be used and housed within a heating unit.

FIG. 15 shows pan utensils 1500 which may be used with the apparatus and, in particular, are of shallow construction to enable the utensils to be stowed within the enclosure formed by the top and bottom covers as described above. As shown, pan utensil 1500 has retractable members 1502 that swivel outward to form a handle. Pan utensil 1500 may be designed with very particular dimensions to best fit other components when stored in the container formed by the top and bottom covers 310, 320.

Figure 16:
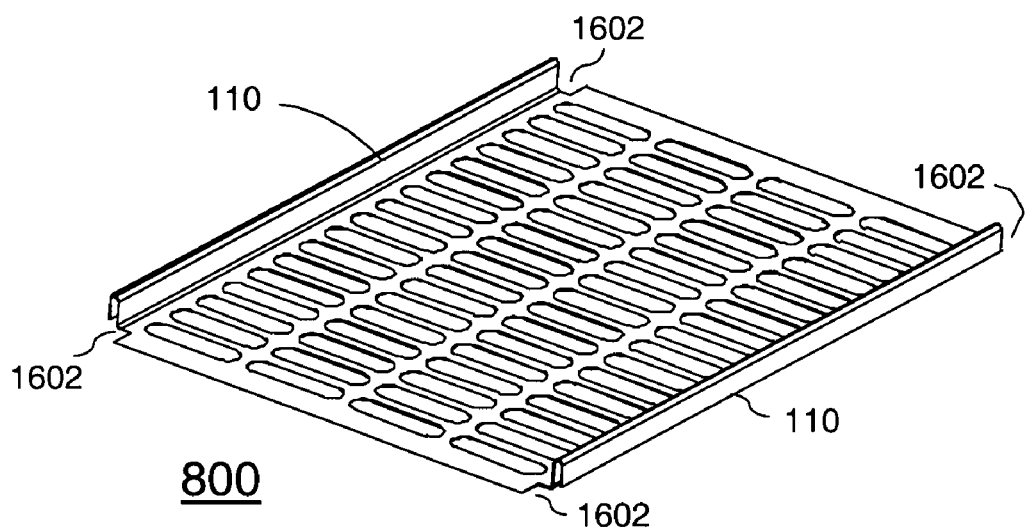
FIG. 16 illustrates one form of grill as may be used in a heating unit in accordance with an exemplary embodiment of the present invention.

FIG. 16 shows one implementation of a grill as may be formed by stamping or laser cutting a grill pattern from a sheet of material and forming the edges to engage the side panels of the assembled frame. As shown in FIG. 16, rails 110 are sharply bent in a U-shaped manner to fit onto the upper edges of side panels, such as side panels 302, 304, 307 depicted in FIGS. 3-5. The version of grill 108 shown in FIG. 16 also includes cut-outs 1602 at each corner to provide clearance for joints 200 at which side panels and end panels are connected.

The 'grill' as shown by way of example herein may be generally described as one form of a transverse support member upon which food items or cooking utensils may be placed and held above a heat source. The transverse support member may comprise any or all of: an open grill having a mesh or perforated structure, a flat surface formed from a solid sheet of material, a flat pan, a tray. The transverse support member may comprise a combination of the these features wherein some portions of the surface are open to permit gases and fluids to pass through, while other portions are closed. Closed portions of the transverse support member may be shaped into shallow wells or other features by stamping. It is possible to form both open and closed sections from a single piece of raw material. It will be recognized that a wide variety of designs are possible, including having wells formed in the transverse support member to accommodate containers or to facilitate certain types of cooking, such as poaching of eggs and steam heating or double boiler arrangements. The present invention is not limited to any particular design or manner of construction of the transverse support member.

As used herein the term 'grill' shall be construed to imply any manner of transverse support member as just described, or other similar member whether or not the member is configured for the purpose of 'grilling' per se. The grill may be of wire frame construction. The grill need not be of a single, rigid piece and may comprise entirely separate pieces, such as rods or panels, or may comprise a hinging or interlocking arrangement of cooperative pieces. Those of skill in the art, in view of the present teachings, will recognize that there are a number of ways to form a grill or transverse support to suit a given set of purposes and to accommodate the grill with a frame enclosure according to the present teachings so that the grill is supported and enclosed as desired. The design of the grill and frame enclosure may complement one another such that grill fits snugly into the frame and bears against the side panel and/or end panel members to lend additional rigidity to the structure or to further promote the side panels remaining sufficiently coupled to one another that the frame structure may be lifted as a single piece.

Figure 8:
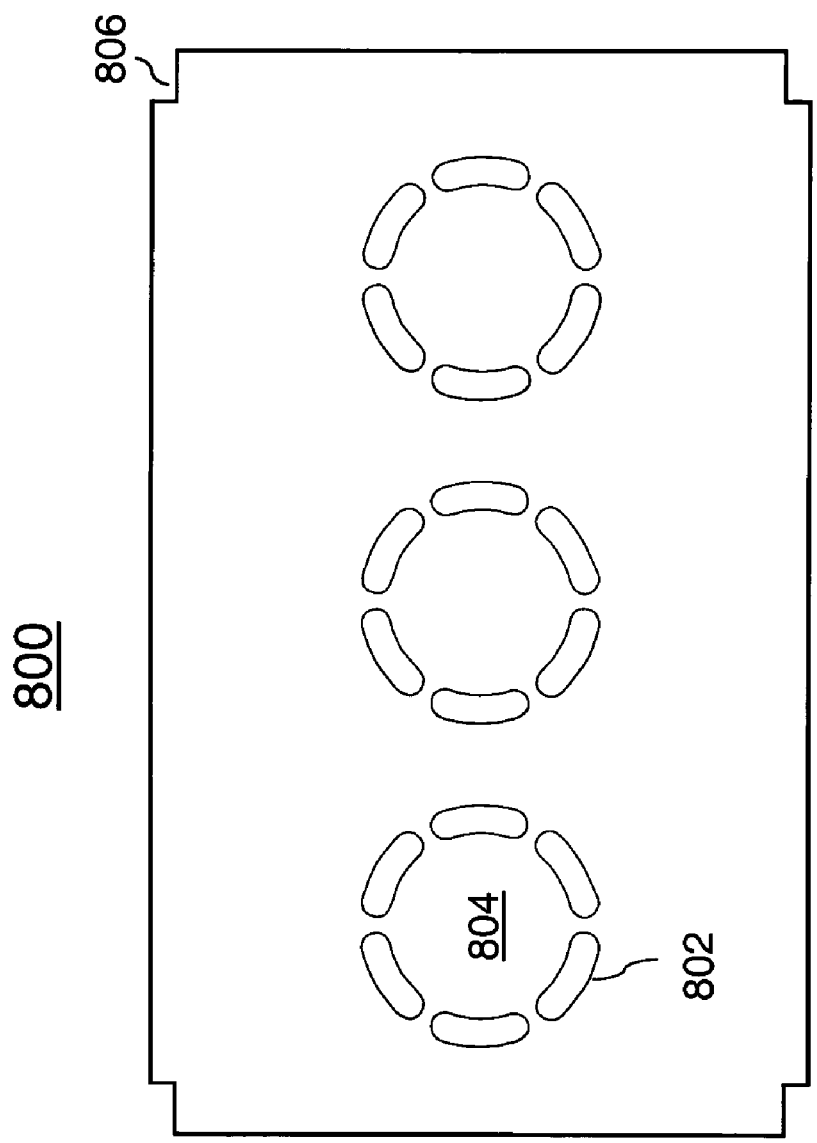
FIG. 8 depicts the shape of a plate to serve as a heat spreader and flame shield.

Referring now back to FIG. 8, a pattern is shown for a heat spreader 800 which may be formed by cutting or stamping the pattern from sheet of material such as a metal plate. Heat spreader 800 is preferably interposed between the grill and one or more heat sources located at the bottom of the assembled unit. Heat spreader 800 serves to spread out the heating from certain types of heat sources which produce a small area of intense heat. Some heat sources of this type include alcohol flames, methane or propane gas flames or ESBIT(R)-brand solid fuel tablets. Without heat spreader 800, localized convection currents and radiant heating from these sources may cause very uneven heating across the grill surface. Another benefit to using heat spreader 800 is that the heat sources are shielded from dripping grease, juices or boilover spillage from items being heated on the grill. Without heat spreader 800, materials falling or dripping from the grill might extinguish the heat source or cause 'flare-ups' or other problems. In use, the central portion 804 of each hole pattern 802 is roughly centered over a heat source for reasons that will be apparent in FIG. 9.

Figure 9:
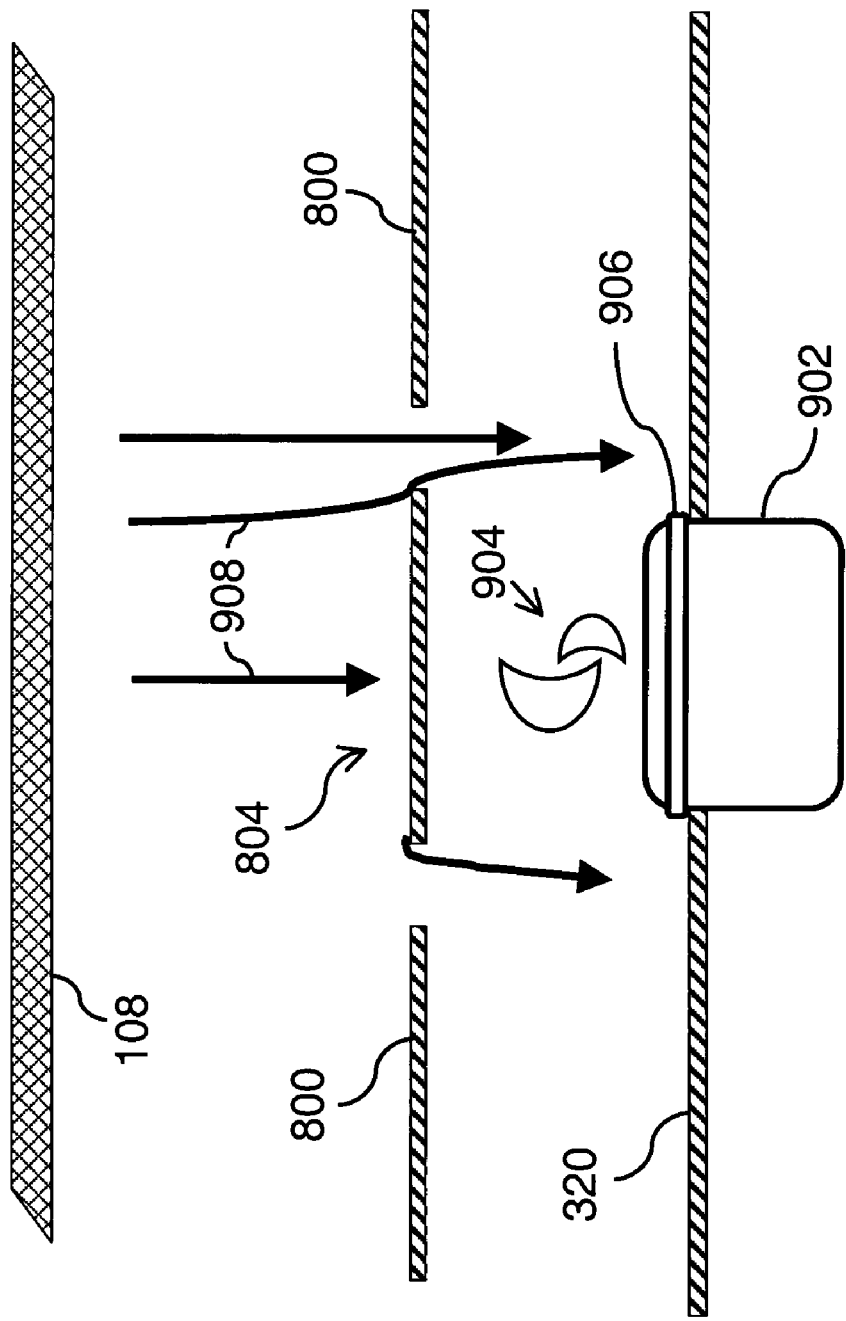
FIG. 9 depicts the manner in which a heat spreader may protect a heat source from materials falling from a grill above the heat source.

FIG. 9 shows how heat spreader 800 acts to protect a heat source. In FIG. 9, arrows 908 represent the paths of falling materials such as grease or other dripping fluids from grill 108. In some locations on the grill, these materials tend to fall towards a flame 904 emanating from a fuel canister 902. It may be seen from arrows 908 that heat spreader 800, properly positioned with a hole pattern being centered over the flame 904 or heat source, serves to block or divert the materials so that they do not fall directly onto the flame or heat source.

As an alternative to heat spreader 800, individual or free standing heat spreader/flame protectors may be deployed separately and positioned over one or more heat sources. A single heat spreader or drip pan similar to heat spreader 800 or one or more smaller, individual spreaders or drip pans may be hung directly from the grill or transverse support member, suspended underneath. These implements may be compact or collapsible to facilitate storage of the overall unit.

FIG. 9 also reveals an optional implementation of bottom cover 320 as having one or more holes for accommodating certain types of heat sources, such as an alcohol-bearing canister 902. For practical reasons, it is desirable that most of canister 902 remain outside of the heated enclosure to avoid the dangers of boiling of the fuel. Canister 902 is typically manufactured having a seam or seal 906 as shown, which provides a convenient way to support the canister using a hole in the bottom cover 320 as shown.

Figure 10:
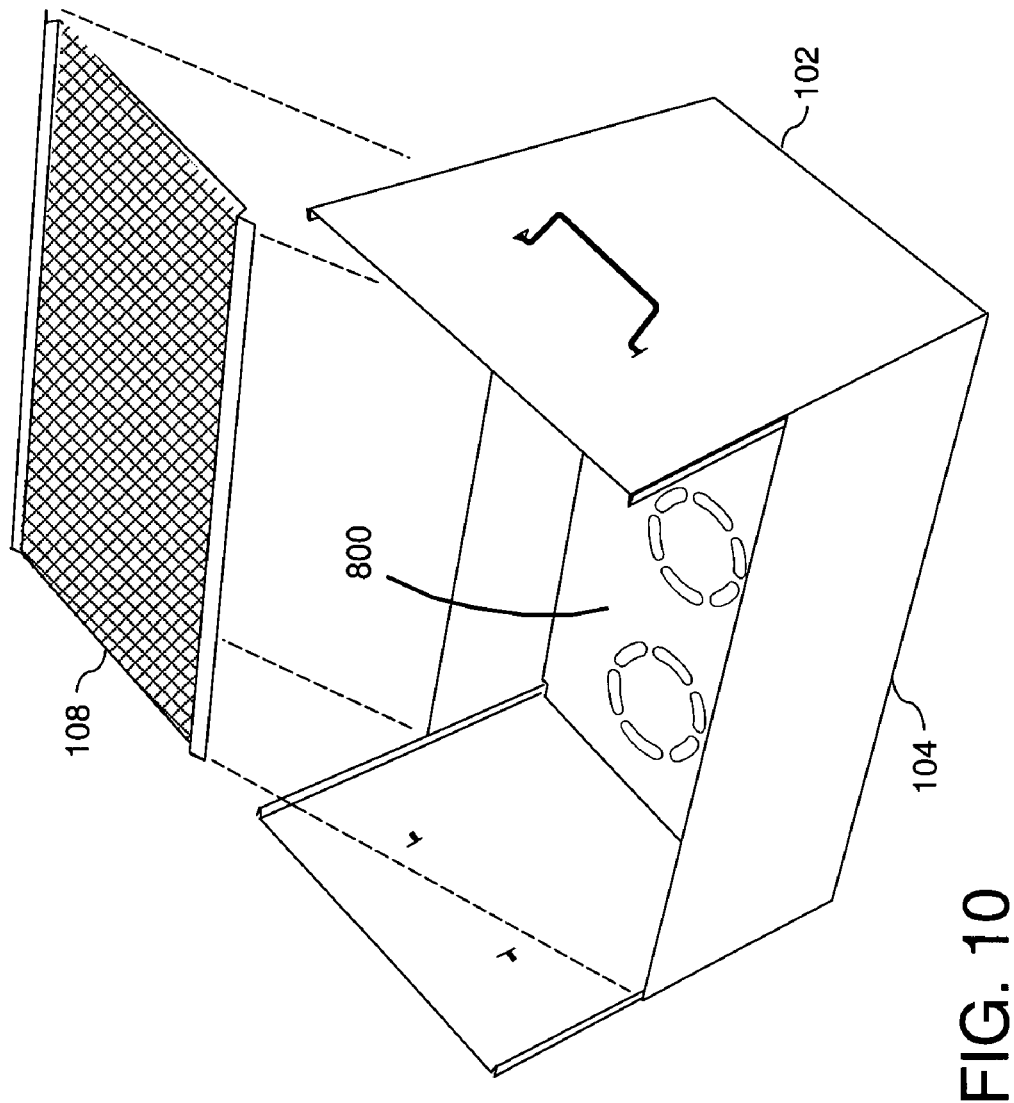
FIG. 10 depicts the manner in which a heat spreader may be positioned underneath a grill within a frame enclosure in accordance with an exemplary embodiment of the present invention.

The manner in which optional heat spreader 800 may nestle within frame 100 is depicted in FIG. 10. Heat spreader 800 is preferably supported approximately 2-3 inches above the heat source. Heat spreader 800 may have its own standoffs or legs (not shown) so that it is supported by resting upon the bottom cover 320 independently from the surrounding frame 100. Alternatively, heat spreader 800 may engage side panels 302-307 or end panels 102 and be adjustable in much the same manner as described for the grill 108.

Any of the elements described herein may be constructed of suitable materials that will withstand exposure to heat and to food residues. It is preferable that the materials used for construction be lightweight, amenable to cleaning and tolerant of temperature extremes and exposure to weather. It is further preferable that such materials be free of potentially toxic metals or organic compounds and that they do not emit any such toxins when exposed to cooking temperatures during use of the unit.

Materials, finishes or fabrication may also be chosen to either reflect radiant heat, conduct heat or dissipate heat depending upon where and how the components are used within the overall unit. For example, the interior surfaces of the side panels may have a shiny finish to reflect radiant heat whereas the top panel may be designed to have a black body surface so as to absorb and radiate heat energy rather than reflect it. The handles may be designed to reduce heat conduction and to dissipate heat. Those of ordinary skill will recognize that variety of materials and finishes may be chosen as a matter of functional and aesthetic design and that implementations of the present invention could encompass a wide variety of design choices in this regard.

Depending on design and usage circumstances, suitable materials may include stainless steel, aluminum, titanium, certain plated or dipped-finish metals, ceramics or oxides, or even high-temperature polymers or composite materials. For the side panels, for example, raw sheet material may be stamped, cut, formed and otherwise processed in ways that are very familiar to those of ordinary skill. Side panels may also be extruded from suitably ductile materials. The construction may involve additional processing to create folds, hinges, notches, dimples, tabs or other features along edges so that adjacent side panels may attach to one another. The transverse support member or grill may be similarly formed by cutting, punching, stamping, drilling of sheet or plate of raw material, such as metal. The grill may be formed of metal wires or rods woven, twisted or welded together as is commonplace in the art. Any number of arrangements of wire structures are possible to form a mesh, a basket or other structure to serve as the grill or as a portion thereof. Finishes for various panels, covers, handles, legs or grill used in an embodiment of the present invention may comprise anodized, chromated, plated, ceramic coated, high-temperature painted and porcelain finishes or any other suitable finishes.

In the preceding detailed description, a few possible embodiments of the present invention are illustrated merely by way of example. None of the elements, materials, suggested methods of use in the description of the present application should be construed as critical or essential to the invention unless explicitly described as such. Also, as used herein, the article "a" is intended to include one or more items. Where only one item is intended, the term "one" or similar language is used.

What is claimed is:

1. A device facilitating the heating of items, the device comprising:
    at least one grill for supporting an item to be heated; and
    a collapsible frame for suspending the grill above a heat source, the frame having a plurality of vertical sides, at least one of the vertical sides being designated as a first side having user-selectable variable construction and the sides other than the designated first side collectively constituting the remainder of the frame;
    wherein the first side having user-selectable variable construction is constructed Of at least one panel selected by a user from among a plurality of panels available for constructing the first side by being removably attached to the remainder of the frame;
    and wherein the at least one panel directly supports the grill;
    and wherein the remainder of the frame attaches to at least one combination of multiple ones of the available panels vertically stacked along the first side;
    and wherein the available panels exhibit different vertical heights when applied to the frame and Wherein the designated first side is selectively constructed by a user to include a panel of specific height by which the user adjusts at least one of: how much of the first side of user-selectable variable construction is substantially enclosed or at what height the grill is supported by the frame.

2. The device of claim 1 wherein the device operates in at least one user-selectable in-use configuration wherein the first side having user-selectable variable construction is constructed with fewer than all of the available panels that are able to be used on the first side concurrently and any unused panels from the plurality of available panels are entirely excluded from the construction of the first side having user-selectable variable construction.

3. The device of claim 1 wherein a vertical position at which the at least one panel selected by the user is attached to the remainder of the frame is selectable by the user from among more than one possible such position of attachment.

4. The device of claim 3 wherein the position of attachment of the panel changes at least one of: a proportion of the first side that is substantially enclosed, which portion of the first side is substantially enclosed by the panel, or a height above the heat source at which the grill is supported by the frame.

5. The device of claim 1 wherein the first side having user-selectable variable construction is constructed of a first quantity of panels to establish a first value of a variable attribute and alternatively constructed of a second quantity of panels to establish a second value of the variable attribute, the variable attribute being at least one of a proportion of the first side that is substantially enclosed or a height above the heat source at which the grill is supported by the frame.

6. The device of claim 1 wherein the first side having user-selectable variable construction is constructed to comprise a first panel and a second panel, the first and second panels having different heights, wherein, in attaching the first and second panels to the remainder of the frame, the first panel is placed above the second panel to support the grill at a first height and the first panel is placed below the second panel to support the grill at a second height different from the first height.

7. The device of claim 1 wherein the first side having user-selectable variable construction comprises first and second panels, both concurrently attached to the remainder of the frame, and the grill is user-selectable to either be directly supported by the first panel in accordance with a first user-selectable configuration or to be directly supported by the second panel in accordance with a second user-selectable configuration.

* * * * *